US011227048B2

(12) United States Patent
Chistyakov et al.

(10) Patent No.: US 11,227,048 B2
(45) Date of Patent: Jan. 18, 2022

(54) METHOD AND SYSTEM FOR DETECTING MALICIOUS FILES USING BEHAVIOR PATTERNS

(71) Applicant: AO Kaspersky Lab, Moscow (RU)

(72) Inventors: Alexander S. Chistyakov, Moscow (RU); Alexey M. Romanenko, Moscow (RU); Alexander S. Shevelev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 374 days.

(21) Appl. No.: 16/414,832

(22) Filed: May 17, 2019

(65) Prior Publication Data

US 2020/0210576 A1     Jul. 2, 2020

(30) Foreign Application Priority Data

Dec. 28, 2018  (RU) ................................ 2018147233

(51) Int. Cl.

| G06F 21/55 | (2013.01) |
|---|---|
| G06N 20/00 | (2019.01) |
| G06F 21/56 | (2013.01) |
| G06F 21/52 | (2013.01) |
| G06N 3/08 | (2006.01) |

(52) U.S. Cl.
CPC ............ G06F 21/554 (2013.01); G06F 21/52 (2013.01); G06F 21/566 (2013.01); G06N 20/00 (2019.01); *G06F 2221/033* (2013.01); *G06F 2221/034* (2013.01); *G06N 3/08* (2013.01)

(58) Field of Classification Search
CPC ........ G06F 21/54; G06F 21/52; G06F 21/566; G06N 20/00
See application file for complete search history.

(56) References Cited

U.S. PATENT DOCUMENTS

| 9,288,220 B2 | 3/2016 | Raugas et al. |
| 9,516,053 B1 * | 12/2016 | Muddu ............... H04L 63/1433 |
| 2017/0353477 A1 * | 12/2017 | Faigon ................ G06F 21/6209 |
| 2019/0050567 A1 | 2/2019 | Chistyakov et al. |

FOREIGN PATENT DOCUMENTS

| CA | 2990262 A1 * | 11/2018 | .......... G06F 11/3419 |
| JP | 2017505944 A  * | 2/2017 | |
| RU | 2654151 C1 | 5/2018 | |
| WO | WO-2019075399 A1 * | 4/2019 | .......... G06F 11/3062 |

* cited by examiner

*Primary Examiner* — Meng Li
*Assistant Examiner* — Shu Chun Gao
(74) *Attorney, Agent, or Firm* — Arent Fox LLP; Michael Fainberg

(57) ABSTRACT

Disclosed herein are methods and systems for detecting malicious files. An exemplary method comprises emulating execution of a file under analysis, forming a behavior log of the emulated execution of the file under analysis, forming one or more behavior patterns from commands and parameters selected from the behavior log, calculating a convolution of the one or more behavior patterns, selecting two or more models for detecting malicious files from a database, calculating a degree of maliciousness of the file being executed based using the convolution and the two or more models, forming a decision making template based on the degree of maliciousness and determining that the file is malicious when a degree of similarity between the decision making template and a predetermined decision making template exceeds a predetermined threshold value.

12 Claims, 10 Drawing Sheets

METHOD AND SYSTEM FOR DETECTING MALICIOUS FILES USING BEHAVIOR PATTERNS

CROSS-REFERENCE TO RELATED APPLICATIONS

This application claims the benefit of priority under 35 U.S.C. 119(a)-(d) of Russian Application No. 2018147233 filed on Dec. 28, 2018, the contents of which are incorporated in their entirety herein.

FIELD

The present disclosure relates to antivirus technologies and, more particularly to systems and methods for detection of malicious files.

BACKGROUND

The rapid growth of computer technologies in the last decade, and also the widespread use of various computing devices (personal computers, notebooks, tablets, smartphones, and so on), have become a powerful stimulus for the use of those devices in diverse areas of activity and for a huge number of tasks (from Internet surfing to bank transfers and electronic document traffic). In parallel with the growth in the number of computing devices and the volume of software running on these devices, the number of malicious programs has also grown at a rapid pace.

A huge number of varieties of malicious programs exists at present. Some of them steal personal and confidential data from the devices of users (such as logins and passwords, bank details, electronic documents). Others form so-called botnets from the devices of users for attacks such as a DDoS (Distributed Denial of Service) or for sorting through passwords by the method of brute force against other computers or computer networks. Still others propose paid content to users through intrusive advertising, paid subscriptions, sending of SMS to toll numbers, and so forth.

Special programs known as antiviruses deal are used to combat malicious programs, including the detecting of malicious programs, the preventing of infection, and the restoring of the working capacity of the computing devices infected with malicious programs. Antivirus programs employ various technologies to detect the full variety of malicious programs, such as:

- static analysis—the analysis of programs for maliciousness, excluding the launching or emulating of the working of the programs being analyzed, on the basis of the data contained in the files making up the programs being analyzed, wherein it is possible to use during statistical analysis:
  - signature analysis—the search for correspondences of a particular segment of code of the programs being analyzed to a known code (signature) from a database of signatures of malicious programs;
  - white and black lists—the search for calculated check sums from the programs being analyzed (or portions thereof) in a database of check sums of malicious programs (black lists) or a database of check sums of safe programs (white lists);
- dynamic analysis—the analysis of programs for maliciousness on the basis of data obtained in the course of execution or emulation of the working of the programs being analyzed, wherein it is possible to use during dynamic analysis:
  - heuristic analysis—the emulation of the working of the programs being analyzed, the creating of emulation logs (containing data on the calls of API functions, the parameters transmitted, the code segments of the programs being analyzed, and so on) and the search for correspondences between the data of the logs created and the data from a database of behavioral signatures of malicious programs;
  - proactive protection—the intercepting of calls of API functions of the launched programs being analyzed, the creating of logs of the behavior of the programs being analyzed (containing data on the calls of API functions, the parameters transmitted, the code segments of the programs being analyzed, and so on) and the search for correspondences between the data of the logs created and the data from a database of calls of malicious programs.

Both static and dynamic analysis have their pluses and minuses. Static analysis is less demanding on the resources of the computing device on which the analysis is being done, and since it does not require the execution or the emulation of the program being analyzed, statistical analysis is faster, but at the same time less effective, i.e. it has a lower percentage of detection of malicious programs and a higher percentage of false alarms (i.e. making a decision that a file analyzed by the means of the antivirus program is malicious, when the analyzed file is safe). Dynamic analysis, since it uses data obtained during the execution or emulation of the working of the program being analyzed, is slower and makes higher demands on the resources of the computing device on which the analysis is being performed, but at the same time it is also more effective. Modern antivirus programs employ a comprehensive analysis, including elements of both static and dynamic analysis.

Since modern standards of information security require an operative response to malicious programs (especially to new ones), automatic means of detection of malicious programs are the main focus of attention. For the effective operation of such means, elements of artificial intelligence and various methods of machine learning by models for the detection of malicious programs (i.e. sets of rules for decision making as to the maliciousness of a file on the basis of a certain set of input data describing the malicious file) are often used, enabling effective detection of not only well known malicious programs or malicious programs with well-known malicious behavior, but also new malicious programs having unknown or little studied malicious behavior, as well as operative adaptation (learning) to detect new malicious programs.

Although known technologies deal well with the detection of malicious files having certain characteristic attributes (i.e. data describing certain features of files from a certain group of files, such as the presence of a graphic interface, data encryption, data transmission through a computer network, and so on) similar to the characteristic features of already known malicious files, they are unable to deal with the detection of malicious files having characteristic features different from the characteristic features of already known malicious files (albeit similar behavior), and furthermore the above-described technology does not disclose such aspects of machine learning by models as testing and retraining of models, as well as forming and reforming of the characteristic features (depending on the results of the aforementioned testing).

The present disclosure makes it possible to solve the problem of detecting malicious files.

SUMMARY

The present disclosure is designed for the antivirus scanning of files.

One of the many exemplary technical results of the present disclosure consists in increasing the quality of scanning of a file for maliciousness.

Yet another exemplary technical result of the present disclosure consists in reducing the computing resources used in performing the scanning of a file for maliciousness.

These results are accomplished with the aid of a method, system and computer program product for detecting a malicious file.

In one aspect, an exemplary method for detecting malicious files comprises emulating, using a processor, execution of a file under analysis, forming, using a processor, a behavior log of the emulated execution of the file under analysis, forming one or more behavior patterns from commands and parameters selected from the behavior log, calculating a convolution of the one or more behavior patterns, selecting two or more models for detecting malicious files from a database, calculating a degree of maliciousness of the file being executed based using the convolution and the two or more models, forming a decision making template based on the degree of maliciousness and determining that the file is malicious when a degree of similarity between the decision making template and a predetermined decision making template exceeds a predetermined threshold value.

In another aspect, emulating further comprises opening the file under analysis by an interpreter.

In another aspect, the behavior log comprises intercepted commands and parameters to the commands originating from the file under analysis.

In another aspect, the method further comprises forming the decision making template based on a plurality of degrees of maliciousness.

In another aspect, the plurality of the degrees of maliciousness is a measure of the central tendency of the calculated degrees of maliciousness.

In another aspect, the plurality of the degrees of maliciousness represents the change in the degrees of maliciousness as a function of time or the number of behavior patterns used to calculate the degree of maliciousness.

In another aspect, the method further comprises detecting that the degree of similarity between the decision making template and at least one of the predetermined decision making templates exceeds a first predetermined threshold, detecting that the degree of maliciousness calculated using the two or more models for detecting malicious files do not exceed a second predetermined threshold and retraining at least one of the two or more models for detecting malicious files.

In another aspect, an inverse convolution function of a result of a convolution function performed to calculate the convolution has a degree of similarity to the one or more behavior patterns greater than a predetermined threshold value.

In another aspect, a system for detecting malicious files is provided, the system comprising a hardware processor configured to emulate execution of a file under analysis, form a behavior log of the emulated execution of the file under analysis, form one or more behavior patterns from commands and parameters selected from the behavior log, calculate a convolution of the one or more behavior patterns, select two or more models for detecting malicious files from a database, calculate a degree of maliciousness of the file being executed based using the convolution and the two or more models, form a decision making template based on the degree of maliciousness and determine that the file is malicious when a degree of similarity between the decision making template and a predetermined decision making template exceeds a predetermined threshold value.

In another aspect of the disclosure, a non-transitory computer-readable medium is provided storing instructions thereon for executing the methods provided herein.

The above simplified summary of example aspects of the disclosure serves to provide a basic understanding of the disclosure. This summary is not an extensive overview of all contemplated aspects, and is intended to neither identify key or critical elements of all aspects nor delineate the scope of any or all aspects of the disclosure. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for the antivirus scanning of files. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following definitions and concepts are used throughout the description of variant aspects of the present disclosure.

Malicious file—a file of which the execution is known to be able to result in unauthorized destruction, blocking, modification, copying of computer information or neutralization of the methods of protection of computer information.

Malicious behavior of a file being executed—a group of actions which may be performed during execution of that file and which are known to be able to result in unauthorized destruction, blocking, modification, copying of computer information or neutralization of the methods of protection of computer information.

Malicious activity of a file being executed—a group of actions performed by that file in accordance with its malicious behavior.

Computing device of the average user—a hypothetical (theoretical) computing device having averaged characteristics of the computing devices of a group of users selected in advance on which the same applications are executed as on the computing devices of those users.

Command executable by a computing device—a set of machine instructions or instructions of scripts executable by a computing device on the basis of the parameters of those instructions, known as command parameters or parameters describing said command.

Lexical analysis (tokenizing)—a process of analytical parsing of an input sequence of characters into recognized groups (hereafter: lexemes), in order to form at the output identification sequences (hereafter: tokens).

Token—an identification sequence formed from a lexeme in the process of lexical analysis.

Figure 1:
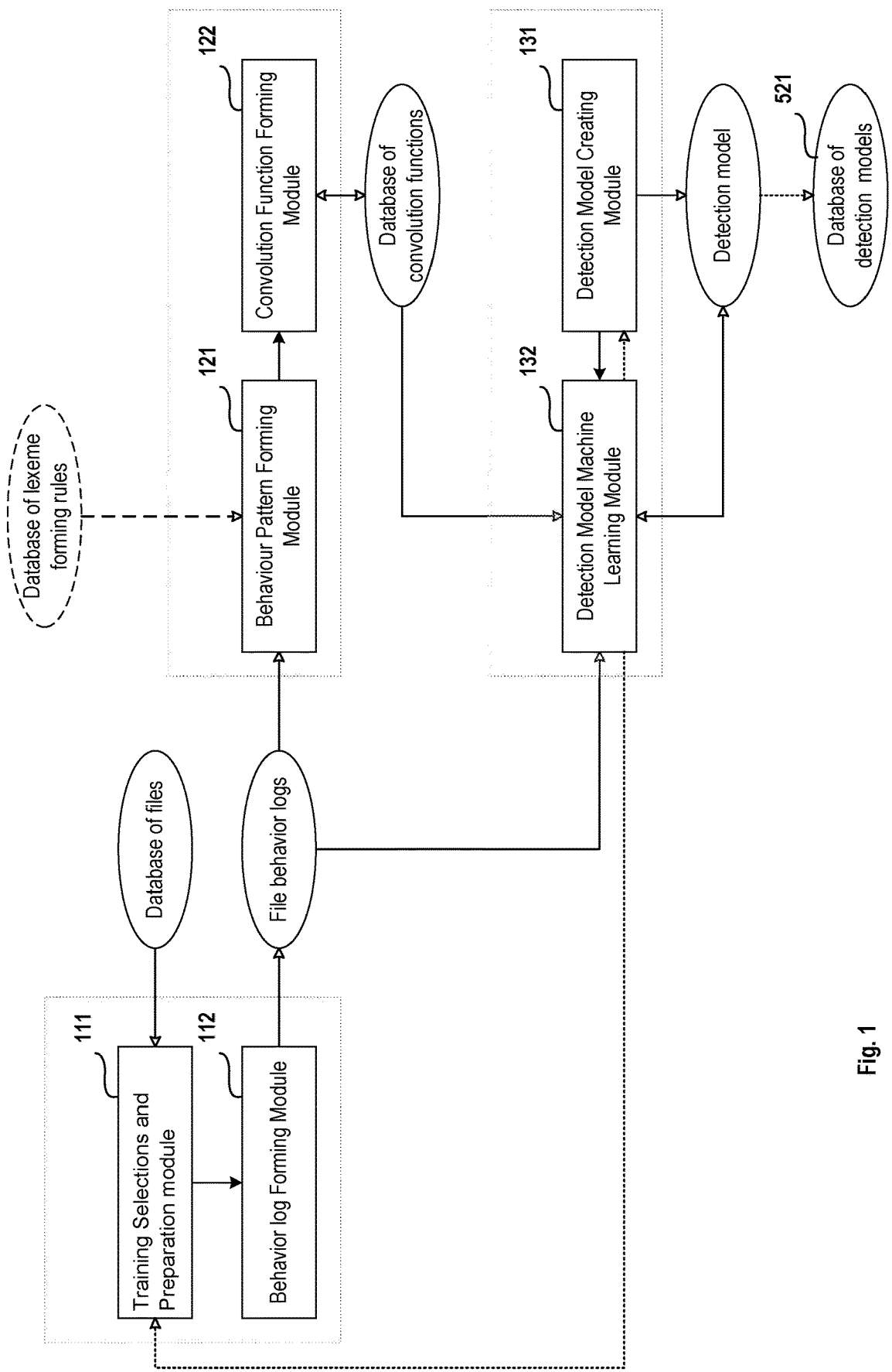
FIG. 1 shows the structural diagram of the system for machine learning by a model for detection of malicious files, in accordance with exemplary aspects of the present disclosure.

FIG. 1 shows the structural diagram of the system for machine learning by a model for detection of malicious files.

The structural diagram of the system for machine learning consists of a training selections preparation module 111, a behavior log forming module 112, a behavior pattern forming module 121, a convolution function forming module 122, a detection model creation module 131, a detection model machine learning module 132, a degree of maliciousness calculation module 142, and a resource management module 143.

In one variant aspect of the system, the aforementioned system of machine learning by the model for detection is a client-server architecture, in which the training selections preparation module 111, the behavior log forming module 112, the behavior pattern forming module 121, the convolution function forming module 122, the detection model creation module 131, and the detection model machine learning module 132 work at the server side, and the behavior pattern forming module 121, the degree of maliciousness calculation module 142 and the resource management module 143 work on the client side.

For example, the client may be the computing devices of a user, such as personal computer, notebook, smartphone, and so forth, and the server may be the computing devices of an antivirus company, such as distributed systems of servers by means of which, besides everything else, a preliminary collection and antivirus analysis of files, a creation of antivirus records, and so forth, will be performed, wherein the system of machine learning by a model for detection of malicious files will be used to detect malicious files at the client side, thereby enhancing the effectiveness of the antivirus protection of that client.

In yet another example, both the client and the server may be the computing devices of the antivirus company alone, wherein the system of machine learning by the model for detection of malicious files will be used for an automated antivirus analysis of files and creation of antivirus records, thereby enhancing the working effectiveness of the antivirus company.

The training selections preparation module 111 is designed to:
  select at least one file from a database of files in accordance with predetermined rules of forming a training selection of files, after which the detection model machine learning module 132 will carry out the training of the detection model on the basis of an analysis of the selected files;
  send the selected files to the behavior log forming module 112.

In one variant aspect of the system, at least one safe file and one malicious file are kept in the database of files.

For example, in the database of files safe files may be the files of the Windows operating system, and malicious files may be the files of backdoors, applications carrying out unauthorized access to data and to remote control of an operating system and a computer as a whole. Furthermore, the model for detection of malicious files trained on the aforementioned files using methods of machine learning will be able to detect malicious files having a functionality similar to the functionality of the aforementioned backdoors with high accuracy (the more files were used for the training of the aforementioned model for detection the higher the accuracy).

In yet another variant aspect of the system, at least:
  suspicious files (riskware)—files which are not malicious, yet are able to carry out malicious actions;
  unknown files—files of which the maliciousness has not been determined and remains unknown (i.e. files which are not safe, malicious, suspicious, and so forth) are additionally kept in the database of files.

For example, in the database of files suspicious files may be the files of applications for remote administration (such as RAdmin), archiving, or data encryption (such as WinZip), and so on.

In yet another variant aspect of the system, at least files:
  collected by antivirus web crawlers;
  sent in by users
  are kept in the database of files.

Furthermore, the aforementioned files are analyzed by antivirus experts, including with the help of automatic methods of file analysis, in order to then make a decision as to the maliciousness of said files.

For example, files sent in by users from their computing devices to the antivirus companies for checking of their maliciousness may be kept in the database of files, in which case the files sent in may be either safe or malicious, and the distribution between the number of said safe and malicious files is close to the distribution between the number of all safe and malicious files located on the computing devices of said users (i.e. the ratio of the number of said safe files to the number of said malicious files differs from the ratio of the number of all safe files to the number of all malicious files located on the computing devices of said users by a quantity less than a specified threshold value $$\left| \frac{N_{clean}}{N_{malware}} - \frac{\forall N_{clean}}{\forall N_{malware}} \right| < \varepsilon.$$

Unlike the files sent in by users (i.e. files which are subjectively suspicious), the files collected by antivirus web crawlers which are designed to search for suspicious and malicious files more often than not prove to be malicious.

In yet another variant aspect of the system, at least one of the following conditions is used as the criteria for selecting files from the database of files:
the distribution between safe and malicious files selected from the database of files corresponds to the distribution between safe and malicious files located on the computing device of the average user;
the distribution between safe and malicious files selected from the database of files corresponds to the distribution between safe and malicious files collected with the help of antivirus web crawlers;
the parameters of the files selected from the database of files correspond to the parameters of the files located on the computing device of the average user;
the number of selected files corresponds to a predetermined value, while the files themselves are selected at random.

For example, the database of files contains 100 000 files, among which 40% are safe files and 60% are malicious files. From the database of files 15 000 files (15% of the total number of files being kept in the database of files) are chosen such that the distribution between the selected safe and malicious files corresponds to the distribution between the safe and the malicious files located on the computing device of the average user and amounts to 95 to 5. For this purpose, 14 250 safe files (35.63% of the total number of safe files) and 750 malicious files (1.25% of the total number of malicious files) are chosen at random from the database of files.

In yet another example, the database of files contains 1 250 000 files, of which 95% are safe files and 5% are malicious files, i.e. the distribution between the safe and malicious files being kept in the database of files corresponds to the distribution between the safe and the malicious files located on the computing device of the average user. Of these files, 5000 files are chosen at random, of which with a high probability ~4750 prove to be safe files and ~250 malicious files.

In yet another variant aspect of the system, the file parameters are at least:
the maliciousness of the file, characterizing whether the file is safe, malicious, potentially dangerous, or the behavior of the computer system when executing the file is not determined, and so forth;
the number of commands performed by the computing device during the execution of the file;
the size of the file;
the applications utilizing the file.

For example, malicious files are chosen from the database of files which are scripts in the "ActionScript" language, executable by the application "Adobe Flash", and not exceeding 5 kb in size.

In yet another variant aspect of the system, the training selections preparation module 111 is additionally designed to:
select at least one more file from the database of files in accordance with predetermined rules of forming a test selection of files, and after this the detection model machine learning module 132 will carry out a verification of the trained detection model on the basis of an analysis of the selected files;
send the selected files to the behavior log forming module 112.

For example, the database of files contains 75 000 files, among which 20% are safe files and 80% are malicious files. First of all, 12 500 files are chosen from the database of files, of which 30% are safe files and 70% are malicious files, and after this the detection model machine learning module 132 will perform the training of the detection model on the basis of an analysis of the selected files, and then 2500 files are selected from the remaining 62 500 files, of which 60% are safe files and 40% are malicious files, and after this the detection model machine learning module 132 will perform a check of the trained detection model on the basis of an analysis of the selected files. The data formulated in the above-described way is called the cross-validation set of data.

The behavior log forming module 112 is designed to:
intercept at least one executable command at least during:
the execution of the file received,
the emulation of the execution of the file received, wherein the emulation of the execution of the file includes the opening of that file (for example, the opening of a script by an interpreter);
determine for each intercepted command at least one parameter describing that command;
form the behavior log of the file received on the basis of the intercepted commands and the parameters so determined, wherein the behavior log constitutes the totality of intercepted commands (hereinafter, the command) from the file, where each command corresponds to at least one parameter so determined and describing that command (hereinafter, the parameter).

For example, the commands intercepted during the execution of a malicious file which collects passwords and transmits them via a computer network and the parameters calculated for said commands may look like:
CreateFile, 'c:\windows\system32\data.pass'
ReadFile, 0x14ea25f7, 0xf000
connect, http://stealpass.com
send, 0x14ea25f7, 0xf000

In one variant aspect of the system, the intercepting of commands from the file is carried out with the aid of at least:
a specialized driver;
a debugger;
a hypervisor.

For example, the intercepting of commands during the execution of the file and the determination of their parameters is carried out with the aid of a driver which utilizes an interception by splicing of the entry point of a WinAPI function.

In yet another example, the intercepting of commands during the emulation of the working of a file is carried out directly by the emulator means which performs said emulation and determines the parameters of the command needing to be emulated.

In yet another example, the intercepting of commands during the execution of the file on a virtual machine is carried out by the hypervisor, which determines the parameters of the command needing to be emulated.

In yet another variant aspect of the system, the intercepted commands from the file are at least:
API functions;
sets of machine instructions describing a predetermined set of actions (macro commands).

For example, malicious programs very often perform a search for certain files and modify their attributes, for which a sequence of commands is executed, such as:
FindFirstFile, 'c:\windows\system32\*.pass', 0x40afb86a
SetFileAttributes, 'c:\windows\system32\data.pass'
FindNextFile, 0x40afb86a
CloseHandle, 0x40afb86a
which may in turn be described by only a single command
_change_attributes, 'c:\windows\system32\*.pass'

In yet another variant aspect of the system, each command is matched up with its unique identifier.

For example, all WinAPI functions may be matched up with numbers in the range of 0x0000 to 0x8000, where each WinAPI function corresponds to its unique number (for example, ReadFile→0x00f0, ReadFileEx→0x00f1, connect→0x03A2).

In yet another variant aspect of the system, several commands describing similar actions are matched up with a single identifier.

For example, all commands such as ReadFile, ReadFileEx, ifstream, getline, getchar and so forth, which describe a reading of data from a file, are matched up with an identifier _read_data_file (0x70F0).

The behavior pattern forming module 121 is designed to:
form at least one behavior pattern on the basis of the commands and parameters selected from the behavior log, wherein the behavior log constitutes the totality of executable commands (hereinafter, the command) from the file, where each command corresponds to at least one parameter describing that command (hereinafter, the parameter), and the behavior pattern is a set of at least one command and a parameter which describes all of the commands of that set (hereinafter, the elements of the behavior pattern);
send the behavior patterns so formed to the convolution function forming module 122;

For example, from the behavior log the following commands $c_i$ and parameters $p_i$ are selected:
$\{c_1, p_1, p_2, p_3\}$,
$\{c_2, p_1, p_4\}$,
$\{c_3, p_5\}$,
$\{c_2, p_5\}$,
$\{c_1, p_5, p_6\}$,
$\{c_3, p_2\}$.

On the basis of the selected commands and parameters, behavior patterns are formed each containing one command and one parameter describing that command:
$\{c_1, p_1\}$, $\{c_1, p_2\}$, $\{c_1, p_3\}$, $\{c_1, p_5\}$, $\{c_1, p_6\}$,
$\{c_2, p_1\}$, $\{c_2, p_4\}$, $\{c_2, p_5\}$,
$\{c_3, p_2\}$, $\{c_3, p_5\}$.

Next, on the basis of the patterns so formed, behavior patterns are formed in addition, containing one parameter each and all the commands which can be described by that parameter:
$\{c_1, c_2, p_1\}$,
$\{c_1, c_3, p_2\}$,
$\{c_1, c_2, c_3, p_5\}$.

Next, on the basis of the patterns so formed, behavior patterns are formed in addition, containing several parameters each and all the commands which can be described by those parameters at the same time:
$\{c_1, c_2, p_1, p_5\}$.

In one variant aspect of the system, the commands and parameters are selected from the behavior log on the basis of rules by which are selected at least:
every i-th command in succession and the parameters describing it, the increment i being predetermined;
the commands executed after a predetermined period of time (for example, every tenth second) from the previous selected command, and describing their parameters;
the commands and the parameters describing them that are executed in a predetermined time interval from the start of execution of the file;
the commands from a predetermined list and the parameters describing them;
the parameters from a predetermined list and the commands which can be described by those parameters;
the first or the random k parameters of commands in the case when the number of command parameters is greater than a predetermined threshold value.

For example, all the commands for working with a hard disk (such as CreateFile, ReadFile, WriteFile, DeleteFile, GetFileAttribute and so on) are selected from the behavior log, and all the parameters describing the selected commands.

In yet another example, every thousandth command is selected from the behavior log, and all the parameters describing the selected commands.

In one variant aspect of the system, the behavior logs are formed in advance from at least two files, one of which is a safe file and the other a malicious file.

In yet another variant aspect of the system, each element of a behavior pattern is matched up with a characteristic such as the type of element of the behavior pattern. The type of element of the behavior pattern (command or parameter) is at least:
a "number range", if the element of the behavior pattern can be expressed as a number
for example, for an element of the behavior pattern constituting the parameter $port_{html}=80$ of the connect command, the type of said element of the behavior pattern may be the "number range from 0x0000 to 0xFFFF",
a "string", if the element of the behavior pattern can be expressed in the form of a string
for example, for an element of the behavior pattern constituting the connect command, the type of said element of the behavior pattern may be a "string less than 32 characters in size",
if the element of the behavior pattern can be expressed in the form of data which can be described by a predetermined data structure, the type of that element of the behavior pattern may be a "data structure"
for example, for an element of the behavior pattern constituting the parameter src=0x336b9a480d490982cdd93e2e49fdeca7 of the find-_record command, the type of said element of the behavior pattern may be the "data structure MD5".

In yet another variant aspect of the system, the behavior pattern additionally includes, as elements of the behavior pattern, tokens formed on the basis of lexical analysis of said elements of the behavior pattern using at least:
predetermined rules for the formation of lexemes,
a previously trained recurrent neural network.

For example, with the aid of lexical analysis of the parameter
'c:\windows\system32\data.pass'
on the basis of the rules for formation of lexemes:
if the string contains the path to a file, determine the disk on which the file is located;
if the string contains the path to a file, determine the folders in which the file is located;
if the string contains the path to a file, determine the file extension;
where the lexemes are:
the paths to the file;
the folders in which the files are located;
the names of the files;
the extensions of the files;
the following tokens can be formed:
"paths to the file"→
'c:\',
"folders in which the files are located"→
'windows',
'system32',
'windows\system32',
"extensions of the files"→
'.pass'.
In yet another example, with the aid of lexical analysis of the parameters
'81.19.82.8', '81.19.72.38', '81.19.14.32'
on the basis of the rule for formation of a lexeme:
if the parameters constitute IP addresses, determine the bit mask (or its analog, expressed by meta-characters) describing said IP addresses (i.e. the bit mask M for which the equality M/\IP=const is true for all those IPs);
the following token can be formulated:
'81.19.*.*'.
In yet another example, from all available parameters comprising numbers, the tokens of the numbers are formed in predetermined ranges:
23, 16, 7224, 6125152186, 512, 2662162, 363627632, 737382, 52, 2625, 3732, 812, 3671, 80, 3200
and sorted by ranges of numbers:
from 0 to 999
→{16, 23, 52, 80, 512, 812},
from 1000 to 9999
→{2625, 3200, 3671, 7224},
from 10000 on
→{737382, 2662162, 363627632, 6125152186}
In yet another variant aspect of the system, tokens are formed from elements of a behavior pattern which consist of strings.
For example, the behavior pattern is the path to a file containing the names of the disk, the director, the file, the file extension, and so forth. In this case, the token may be the name of the disk and the file extension.
C:\Windows\System32\drivers\acpi.sys
→
C:\
*.sys
The convolution function forming module 122 is designed to:
form a convolution function from the behavior pattern such that the inverse convolution function of the result of that convolution function performed on the obtained behavior pattern will have a degree of similarity with the obtained behavior pattern greater than a specified value, i.e.

$$r \sim g^{-1}(g(r))$$

where:
$r_i$ is the behavior pattern,
g is the convolution function,
$g^{-1}$ is the inverse convolution function.
send the convolution function so formed to the detection model machine learning module 132.
In one variant aspect of the system, the convolution function forming module 122 is additionally designed to:
compute the feature vector of a behavior pattern on the basis of the obtained behavior pattern, wherein the feature vector of the behavior pattern may be expressed as the sum of the hash sums of the elements of the behavior pattern;
form a convolution function from the feature vector of the behavior pattern, wherein the convolution function constitutes a hash function such that the degree of similarity of the computed feature vector and the result of the inverse hash function of the result of that hash function of the calculated feature vector is greater than a predetermined value.
In yet another variant aspect of the system, the convolution function is formed by the metric learning method, i.e. in such a way that the distance between the convolutions obtained with the aid of said convolution function for behavior patterns having a degree of similarity greater than a predetermined threshold value is less than a predetermined threshold value, while for behavior patterns having a degree of similarity less than the predetermined threshold value it is greater than the predetermined threshold value.
For example, the feature vector of the behavior pattern may be computed as follows:
first an empty bit vector is created, consisting of 100 000 elements (where one bit of information is reserved for each element of the vector);
1000 elements from the behavior pattern r are set aside for storing data about the commands $c_i$, the remaining 99 000 elements are set aside for the parameters $c_i$ of the behavior pattern r, wherein 50 000 elements (from element 1001 to element 51 000) are set aside for string parameters and 25 000 elements (from element 51 001 to element 76 000) for number parameters;
each command $c_i$ of the behavior pattern r is matched up with a certain number $x_i$ from 0 to 999, and the corresponding bit is set in the vector so created $$v[x_i] = \text{true};$$

for each parameter $p_i$ of the behavior pattern r the hash sum is calculated by the formula:

for strings: $y_i = 1001 + crc32(p_i) \pmod{50000}$ for numbers: $y_i = 51001 + crc32(p_i) \pmod{25000}$ for the rest: $y_i = 76001 + crc32(p_i) \pmod{24000}$, and depending on the calculated hash sum the corresponding bit is set in the vector so created $$v[y_1] = \text{true};$$

The described bit vector with the elements so set constitutes the feature vector of the behavior pattern r.
In yet another variant aspect of the system, the feature vector of the behavior pattern is computed by the formula:

$$D = \sum_i b^i \times h(r_i)$$

where:
- b is the base of the positional system of computation (for example, for a binary vector b=2, for a vector representing a string, i.e. a group of characters, b=8),
- $r_i$ is the i-th element of the behavior pattern,
- h is the hash function, where $0 \le h(r_i) < b$.

For example, the feature vector of the behavior pattern may be computed as follows:
- first yet another empty bit vector (different from the previous example) is created, consisting of 1000 elements (where one bit of information is reserved for each element of the vector);
- the hash sum for each pattern element $r_i$ of the behavior pattern r is calculated by the formula:

$$x_i = 2^{crc32(r_i)(mod\ 1000)},$$

and depending on the computed hash sum, set the corresponding bit in the vector so created $$v[x_i] = true;$$

In yet another variant aspect of the system, the feature vector of the behavior pattern constitutes a Bloom filter.

For example, the feature vector of the behavior pattern may be computed as follows:
- first yet another empty vector (different from the previous examples) is created, consisting of 100 000 elements;
- at least two hash sums for each pattern element $r_i$ of the behavior pattern r are calculated with the aid of a set of hash functions $\{h_j\}$ by the formula:

$$x_{ij} = h_j(r_i)$$

where:

$$h_j(r_i) = crc32(r_i),$$

$$h_j(0) = const_j,$$

and depending on the computed hash sums, set the corresponding elements in the vector so created $$v[x_{ij}] = true.$$

In yet another variant aspect of the system, the size of the result of the formulated convolution function of the feature vector of the behavior pattern is less than the size of said feature vector of the behavior pattern.

For example, the feature vector constitutes a bit vector containing 100 000 elements, and thus has a size of 12 500 bytes, while the result of the convolution function of said feature vector constitutes a set of eight MD5 hash sums and thus has a size of 256 bytes, i.e. ~2% of the size of the feature vector.

In yet another variant aspect of the system, the degree of similarity of the feature vector and the result of the inverse hash function of the result of said hash function of the computed feature vector constitutes a number value in the range of 0 to 1 and is calculated by the formula:

$$w = \frac{\sum (\{h(r_i)\} \wedge \{g_i\})}{\sum \{h(r_i)\}}$$

$$\{h(r_i)\} \wedge \{g_i\} \vee \{h(r_i)\} = \{g_i\}$$

where:
- $h(r_i) \wedge g_i$ signifies the congruence of $h(r_i)$ with $g_i$ and
- $\{h(r_i)\}$ is the set of results of the hash functions of the elements of the behavior pattern,
- $\{g_i\}$ is the set of results of the inverse hash function of the result of the hash function of the elements of the behavior pattern,
- $r_i$ is the i-th element of the behavior pattern,
- h is the hash function,
- w is the degree of similarity.

For example, the computed feature vector constitutes the bit vector
101011100110010010110111011111101000100011001001001101011011010
100011001101101001000100000001011101110011011011,
the result of the convolution function of this feature vector is
1010011110101110101,
and the result of the inverse convolution function of the above-obtained result is
101011100100001001011011100111110100010001100100101000111010110 11011
10001100110110100000010000001011101110011011011011,
(where the bolding denotes elements different from the feature vector). Thus, the similarity of the feature vector and the result of the inverse convolution function is 0.92.

In yet another variant aspect of the system, the aforementioned hash function using an element of the behavior pattern as a parameter depends on the type of element of the behavior pattern:

$$h(r_i) = h_{r_i}(r_i).$$

For example, in order to calculate the hash sum of a parameter from the behavior pattern constituting a string containing the path to the file, the hash function CRC32 is used; for any other string, the Hoffman algorithm; for a data set, the hash function MD5.

In yet another variant aspect of the system, the forming of the convolution function of the feature vector of a behavior pattern is carried out by an auto encoder, wherein the input data are the elements of said feature vector of the behavior pattern, and the output data are data having a coefficient of similarity to the input data greater than a predetermined threshold value.

The detection model creation module 131 is designed to:
- create a model for detection of malicious files, including at least:
  - selection of a method for machine learning by the detection model;
  - initialization of the parameters of the training model, wherein the parameters of the training model which were initialized prior to the start of the machine learning by the detection model are known as hyper parameters;
  - depending on the parameters of the files selected by the training selections preparation module 111;
- send the training model so created to the detection model machine learning module 132.

For example, when selecting the method for machine learning by the detection model, at first a decision is made whether to use as the detection model an artificial neural net or a random forest, then if the random forest is chosen, the separating criterion for the nodes of the random forest is selected; or if an artificial neural net is chosen, the method of numerical optimization of the parameters of the artificial neural net are selected. Furthermore, the decision as to the choice of a particular method for machine learning is made on the basis of the effectiveness of that method in the detecting of malicious files (i.e. the number of errors of the first and second kind occurring in the detecting of malicious files) using input data (behavior patterns) of a predetermined kind (i.e. the data structure, the number of elements of the behavior patterns, the performance of the computing device on which the search for malicious files is being conducted, the available resources of the computing device, and so on).

In yet another example, the method for machine learning by the detection model is selected on the basis of at least:
cross testing, sliding check, cross-validation (CV);
mathematical validation of the criteria AIC, BIC and so on;
A/B testing, split testing;
stacking.

In yet another example, in the event of low performance of the computing device, random forest is chosen, otherwise the artificial neural net is chosen.

In one variant aspect of the system, machine learning is performed for a previously created untrained detection model (i.e. a detection model in which the parameters of that model cannot produce, on the basis of analysis of the input data, output data with accuracy higher than a predetermined threshold value).

In yet another variant aspect of the system, the method of machine learning by the detection model is at least:
decision tree-based gradient boosting;
decision trees;
the k-nearest neighbor method;
the support vector machine (SVM) method.

In yet another variant aspect of the system, the detection model creation module 131 is additionally designed to create a detection model on demand from the detection model machine learning module 132, wherein certain hyper parameters and methods of machine learning are chosen to be different from the hyper parameters and machine learning methods chosen for a previous detection model.

The detection model machine learning module 132 is designed to train the detection model, in which the parameters of the detection model are computed using the obtained convolution function on the obtained behavior patterns, where the detection model constitutes a set of rules for computing the degree of maliciousness of a file on the basis of at least one behavior pattern using the computed parameters of said detection model.

For example, the detection model is trained on a known set of files selected by the training selections preparation module 111, wherein said set of files contains 60% safe files and 40% malicious files.

In one variant aspect of the system, the degree of maliciousness of a file constitutes a numerical value from 0 to 1, where 0 means that the file is safe, and 1 that it is malicious.

In yet another variant aspect of the system, a method of training the detection model is chosen which ensures a monotonic change in the degree of maliciousness of a file depending on the change in the number of behavior patterns formed on the basis of analysis of the behavior log.

For example, a monotonic change in the degree of maliciousness of a file means that, upon analyzing each subsequent behavior pattern, the calculated degree of maliciousness will be not less than the previously calculated degree of maliciousness (for example, after analysis of the 10th behavior pattern, the calculated degree of maliciousness is equal to 0.2; after analysis of the 50th behavior pattern, it is 0.4; and after analysis of the 100th behavior pattern it is 0.7).

In yet another variant aspect of the system, the detection model machine learning module 132 is additionally designed to:
perform a check of the trained detection model on the obtained behavior logs formed on the basis of analysis of files from a test selection of files, in order to determine the correctness of determination of the maliciousness of files from the test selection of files;
in the event of a negative result of the check, send a request at least:
to the training selections preparation module 111 to prepare a selection of files different from the current one used for the training of the detection model;
to the detection model creation module 131 to create a new detection model, different from the current one.

Furthermore, the checking of the trained detection model involves the following. Said detection model has been trained on the basis of a set of files selected by the training selections preparation module 111 for which it was known whether they are safe or malicious. In order to verify that the model for detection of malicious files has been trained correctly, i.e. said detection model is able to detect malicious files and pass over safe files, a checking of said model is performed. For this purpose, said detection model is used to determine whether files from another set of files selected by the training selections preparation module 111 are malicious, it being known in advance whether those files are malicious. Thus, it is determined how many malicious files were "missed" and how many safe files were detected. If the number of missed malicious files and detected safe files is greater than a predetermined threshold value, that detection model is considered to be improperly trained and a repeat machine learning needs to be done for it (for example, on another training selection of files, using values of the parameters of the detection model different from the previous ones, and so forth).

For example, when performing the check of the trained model the number of errors of the first and second kind in detecting malicious files from a test selection of files is checked. If the number of such errors is greater than a predetermined threshold value, a new training and testing selection of files is selected and a new detection model is created.

In yet another example, the training selection of files contained 10 000 files, of which 8500 were malicious and 1500 were safe. After the detection model was trained, it was checked on a test selection of files containing 1200 files, of which 350 were malicious and 850 were safe. According to the results of the check performed, 15 out of 350 malicious files were not detected successfully (4%), while 102 out of 850 safe files (12%) were erroneously considered to be malicious. In the event that the number of undetected malicious files exceeds 5% or accidentally detected safe files exceeds 0.1%, the trained detection model is considered to be improperly trained.

In one variant aspect of the system, the behavior log of the system is additionally formed on the basis of a previously formed log of the behavior of the system and of commands intercepted after the forming of said behavior log of the system.

For example, after the start of the execution of a file for which it is necessary to give a verdict as to the maliciousness or safety of that file, the intercepted executable commands and the parameters describing them are recorded in the behavior log. On the basis of an analysis of these commands and parameters, the degree of maliciousness of that file is calculated. If no decision was made as to the file being recognized as malicious or safe based on the results of the analysis, the intercepting of commands may be continued. The intercepted commands and the parameters describing them are recorded in the old behavior log or in a new behavior log. In the first case, the degree of maliciousness is calculated on the basis of an analysis of all commands and parameters recorded in the behavior log, i.e. even those previously used to calculate the degree of maliciousness.

The degree of maliciousness calculation module 142 is designed to:

calculate the degree of maliciousness on the basis of the behavior log obtained from the behavior log forming module 112 and the detection model obtained from the detection model machine learning module 132, the degree of maliciousness of a file being a quantitative characteristic (for example, lying in the range from 0—the file has only safe behavior—to 1—the file has predetermined malicious behavior), describing the malicious behavior of the file being executed;

send the calculated degree of maliciousness to the resource management module 143.

The resource management module 143 is designed to allocate computing resources of the computer system on the basis of the analysis of the obtained degree of maliciousness, for use in assuring the security of the computer system.

In one variant aspect of the system, the computing resources of the computer system are at least:

the volume of free RAM;

the volume of free space on the hard disks;

the free processor time (quanta of processor time) which can be spent on the antivirus scan (for example, with a greater depth of emulation).

In yet another variant aspect of the system, the analysis of the degree of maliciousness consists in determining the dynamics of the change in the value of degree of maliciousness after each of the preceding calculations of the degree of maliciousness and at least:

allocating additional resources of the computer system in the event of an increase in the value of the degree of maliciousness;

freeing up previously allocated resources of the computer system in the event of a decrease in the value of the degree of maliciousness.

Figure 2:
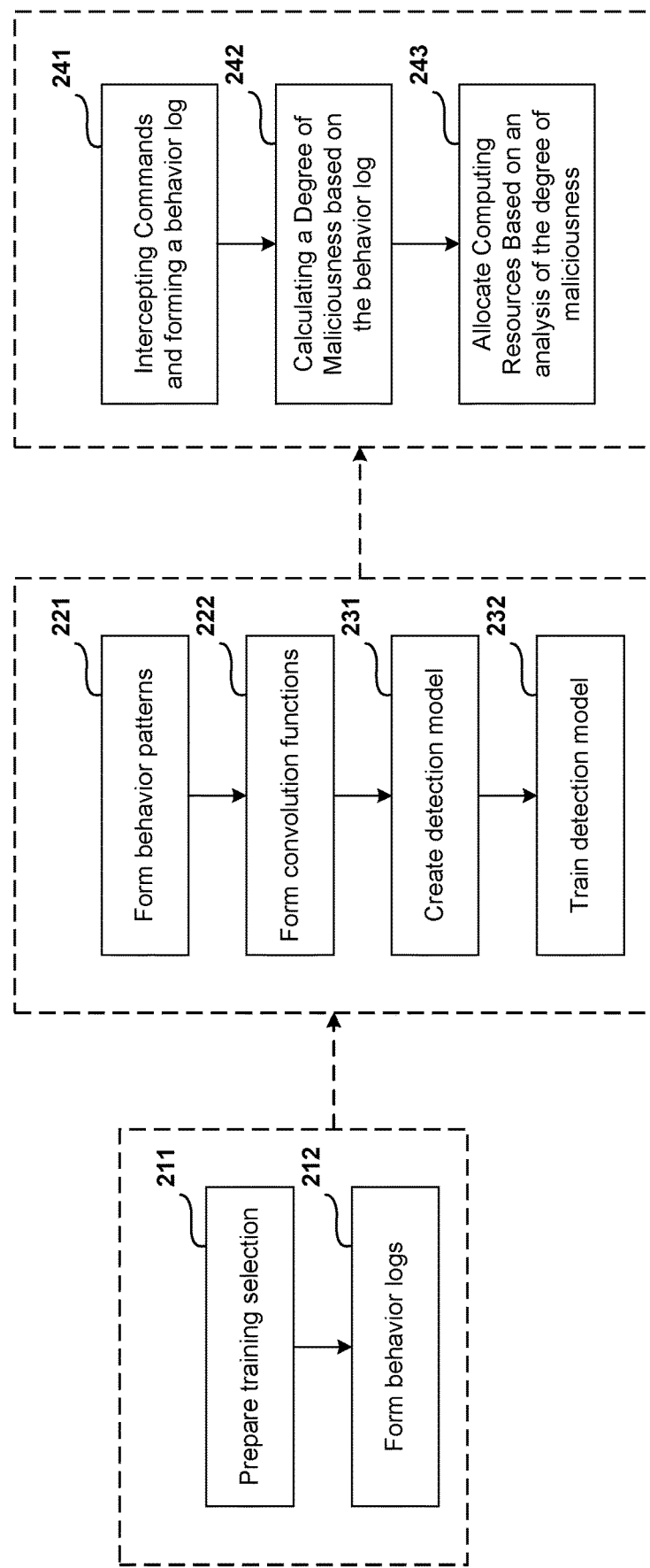
FIG. 2 shows the structural diagram of the method for machine learning by a model for detection of malicious files, in accordance with exemplary aspects of the present disclosure.

FIG. 2 shows the structural diagram of the method for machine learning by a model for detection of malicious files.

The structural diagram of the method for machine learning by a model for detection of malicious files contains a step 211 in which training selections of files are prepared, a step 212 in which behavior logs are formed, a step 221 in which behavior patterns are formed, a step 222 in which convolution functions are formed, a step 231 in which a detection model is created, a step 232 in which the detection model is trained, a step 241 in which the behavior of the computer system is tracked, a step 242 in which the degree of maliciousness is calculated, and a step 243 in which the resources of the computer system are managed.

In step 211, the training selections preparation module 111 is used to select at least one file from a database of files according to predetermined criteria, wherein the training of the detection model will be carried out in step 232 on the basis of the selected files.

In step 212, the behavior log forming module 112 is used:

to intercept at least one command at least during:
the execution of the file selected in step 211,
the emulation of the working of the file selected in step 211;

to determine for each intercepted command at least one parameter describing that command;

to form, on the basis of the commands intercepted and the parameters determined, a behavior log of the obtained file, wherein the behavior log represents the set of intercepted commands (hereinafter, command) from the file, where each command corresponds to at least one defined parameter describing that command (hereinafter, parameter).

In step 221, the behavior pattern forming module 121 is used to form at least one behavior pattern on the basis of the commands and parameters selected from the behavior log formed in step 212, wherein the behavior log represents the set of executable commands (hereinafter, command) from the file, where each command corresponds to at least one parameter describing that command (hereinafter, parameter), the behavior pattern being a set of at least one command and parameter which describes all the commands from that set.

In step 222, the convolution function forming module 122 is used to form a convolution function of the behavior pattern formed in step 221 such that the inverse convolution function of the result of this convolution function performed on that behavior pattern will have a degree of similarity to the aforementioned behavior pattern greater than a specified value.

In step 231, the detection model creation module 131 is used to create a detection model, for which at least:

a method of machine learning by the detection model is selected;

the parameters of the training model are initialized, wherein the parameters of the training model initialized prior to the start of the machine learning by the detection model are known as hyper parameters;

depending on the parameters of the files selected in step 211.

In step 232, the detection model machine learning module 132 is used to train the detection model created in step 231, in which the parameters of that detection model are calculated using the convolution function formed in step 222, performed on the behavior patterns formed in step 221, where the detection model constitutes a group of rules for calculating the degree of maliciousness of a file on the basis of at least one behavior pattern using the calculated parameters of that detection model.

In step 241, the behavior tracking module 141 is used:

to intercept at least one command being executed by the files running in the computer system;

to form a behavior log of the system on the basis of the intercepted commands.

In step 242, the degree of maliciousness calculation module 142 is used to calculate the degree of maliciousness on the basis of the behavior log of the system formed in step 241 and of the detection model trained in step 232.

In step 243, the resource management module 143 is used to allocate computing resources on the basis of the analysis of the degree of maliciousness as calculated in step 242, for use in assuring the security of the computer system.

Figure 3:
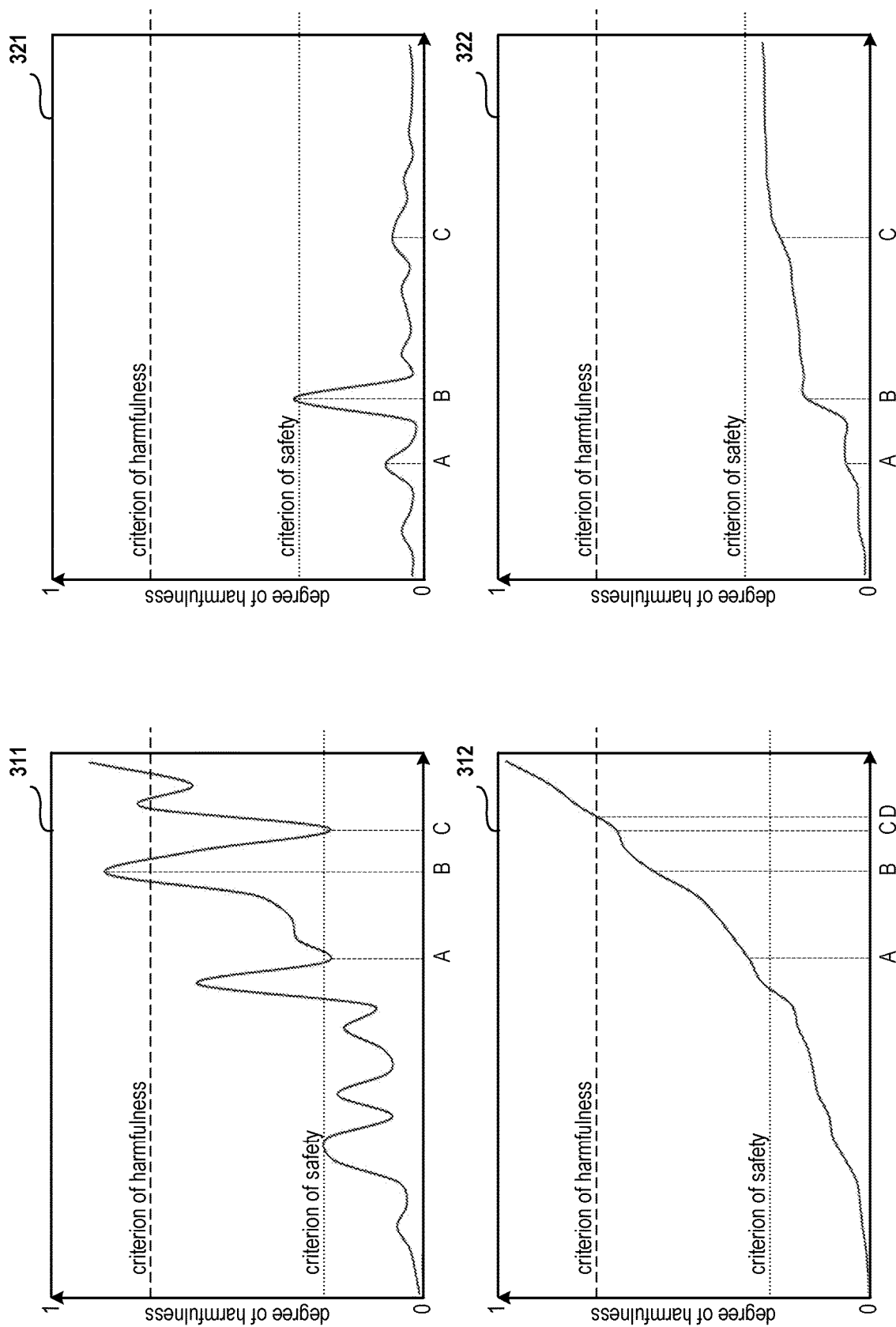
FIG. 3 shows examples of the dynamics of change in the degree of maliciousness as a function of the number of behavior patterns, in accordance with exemplary aspects of the present disclosure.

FIG. 3 shows examples of the dynamics of change in the degree of maliciousness as a function of the number of behavior patterns.

The examples of the dynamics of change in the degree of maliciousness as a function of the number of behavior patterns contain a graph 311 of the dynamics of an arbitrary change in the degree of maliciousness as a function of the number of behavior patterns formed during the execution of a malicious file, a graph 312 of the dynamics of monotonic change in the degree of maliciousness as a function of the number of behavior patterns formed during the execution of a malicious file, a graph 321 of the dynamics of an arbitrary change in the degree of maliciousness as a function of the number of behavior patterns formed during the execution of a safe file, and a graph 322 of the dynamics of monotonic change in the degree of maliciousness as a function of the number of behavior patterns formed during the execution of a safe file.

In one variant aspect of the system, the degree of maliciousness of a file being executed takes on a value in the range of 0 (the file has absolutely safe behavior) to 1 (the file has predetermined malicious behavior).

The graph 311 shows the dynamics of an arbitrary change in the degree of maliciousness as a function of the number of behavior patterns formed during the execution of a malicious file.

In the beginning, upon executing said file the number of behavior patterns formed is not large, and what is more the malicious activity of the file being executed might be absent or minimal (for example, an initialization of data occurs, which is natural to many files, including safe ones), so that the calculated degree of maliciousness differs little from 0 and does not exceed the predetermined threshold value (hereinafter, the criterion of safety), upon exceeding which the behavior of the file being executed will cease to be considered safe (on the graph, this threshold value is designated by a dotted line).

However, in time the malicious activity of the file being executed grows and the degree of maliciousness begins to approach 1, exceeding the criterion of safety, while the degree of maliciousness might not reach the predetermined threshold value (hereinafter, the criterion of maliciousness) upon exceeding which the behavior of the file being executed will be considered to be malicious (on the graph, this threshold value is designated by a dashed line).

After a period of growth, the malicious activity may cease and the degree of maliciousness will again approach 0 (time A). At a certain time, the degree of maliciousness becomes greater than the criterion of maliciousness (time B) and the behavior of the file being executed will be recognized as malicious and in consequence the file itself is recognized as malicious.

Furthermore, the time of recognizing the file as malicious might occur significantly later than the start of growth in malicious activity, since the described approach responds well to an abrupt growth in the degree of maliciousness, which occurs most often during prolonged, clearly manifested malicious activity of the file being executed.

In the case when the malicious activity occurs episodically (left side of the graph 311), the calculated degree of maliciousness might not reach the value after which a decision is made as to the maliciousness of the behavior of the file, and consequently the maliciousness of the file being executed itself.

In the case when the degree of maliciousness is calculated not on the basis of each behavior pattern formed (for example, because the performance of the computing device is not high), a situation is possible where the degree of maliciousness will be calculated at time A (when the malicious activity commences) and time C (when the malicious activity is finished), but will not be calculated at time B (when malicious activity is occurring), so that the calculated degrees of maliciousness will not exceed the criterion of maliciousness, the activity of the file being executed will not be recognized as malicious, and consequently the malicious file will not be detected.

The graph 312 shows the dynamics of monotonic change in the degree of maliciousness as a function of the number of behavior patterns formed during the execution of a malicious file.

In the beginning, upon executing said file the number of behavior patterns formed is not large, and what is more the malicious activity of the file being executed might be absent or minimal (for example, an initialization of data occurs, which is natural for many files, including safe ones), so that the calculated degree of maliciousness differs little from 0 and does not exceed the predetermined threshold value (hereinafter, the criterion of safety), upon exceeding which the behavior of the file being executed file will cease to be considered safe (on the graph, this threshold value is designated by a dotted line).

However, in time the malicious activity of the file being executed grows and the degree of maliciousness begins to approach 1, exceeding the criterion of safety, while the degree of maliciousness might not reach the predetermined threshold value (hereinafter, the criterion of maliciousness) upon exceeding which the behavior of the file being executed will be considered to be malicious (on the graph, this threshold value is designated by a dashed line).

After a period of growth (times A-B), the malicious activity may cease (times B-A), yet the degree of maliciousness will not now decline, but only continue to grow during any malicious activity of the file being executed. At a certain time, the degree of maliciousness becomes greater than the criterion of maliciousness (time D) and the behavior of the file being executed will be recognized as malicious and in consequence the file itself is recognized as malicious.

Furthermore, the time of recognizing the file as malicious might occur immediately after the manifesting of malicious activity, since the described approach responds well to a smooth growth in the degree of maliciousness, which occurs both during prolonged, clearly manifested malicious activity of the file being executed and during frequent episodic less pronounced malicious activity.

In the case when the malicious activity occurs episodically (left side of the graph 311), the calculated degree of maliciousness over time might reach the value after which a decision is made as to the maliciousness of the behavior of the file being executed and the maliciousness of the file being executed itself.

In the case when the degree of maliciousness is calculated not on the basis of each behavior pattern formed (for example, because the performance of the computing device is not high), a situation is possible where the degree of maliciousness will be calculated at time A (when the malicious activity commences) and time C (when the malicious activity is finished), but will not be calculated at time B (when malicious activity is occurring), nevertheless, since the degree of maliciousness changes monotonically, the calculated degrees of maliciousness only increase their values and at time C the degree of maliciousness will exceed the criterion of maliciousness, the activity of the file being executed will be recognized as malicious, and consequently the malicious file will be detected.

The graph 321 shows the dynamics of an arbitrary change in the degree of maliciousness as a function of the number of behavior patterns formed during the execution of a safe file.

In the beginning, upon executing said file the number of behavior patterns formed is not large, and what is more there is no malicious activity as such for the file being executed, but "suspicious" commands might be performed which may also be performed during the execution of malicious files (for example, deletion of files, transfer of data in a computer network, and so on), therefore the calculated degree of maliciousness differs from 0 and does not exceed the predetermined threshold value (hereinafter, the criterion of safety), upon exceeding which the behavior of the file being executed will cease to be considered safe (on the graph, this threshold value is designated by a dotted line).

However, in time the malicious activity of the file being executed grows on account of the execution of a large number of "suspicious" commands and the degree of maliciousness begins to approach 1, while the degree of maliciousness might not reach the predetermined threshold value (hereinafter, the criterion of maliciousness) upon exceeding which the behavior of the file being executed will be considered to be malicious (on the graph, this threshold value is designated by a dashed line), but it might exceed the criterion of safety, so that the file may cease to be considered safe and become "suspicious".

After a period of growth, the malicious activity may cease and the degree of maliciousness will again approach 0 (time C).

In the case when the degree of maliciousness is calculated not on the basis of each behavior pattern formed (for example, because the performance of the computing device is not high), a situation is possible where the degree of maliciousness will be calculated at time B (when the activity is most similar to malicious, i.e. becomes "suspicious") but will not be calculated at time A (when the "suspicious" activity is increasing) or at time C (when the "suspicious" activity is decreasing), so that the calculated degree of maliciousness will exceed the criterion of safety, the activity of the file being executed will be recognized as "suspicious" (will not be considered safe), and consequently the safe file will not be recognized as safe.

The graph 321 shows the dynamics of monotonic change in the degree of maliciousness as a function of the number of behavior patterns formed during the execution of a safe file.

In the beginning, upon executing said file the number of behavior patterns formed is not large, and what is more there is no malicious activity as such for the file being executed, but "suspicious" commands might be performed, which may also be performed during the execution of malicious files (for example, deletion of files, transfer of data in a computer network, and so on), therefore the calculated degree of maliciousness differs from 0 and does not exceed the predetermined threshold value (hereinafter, the criterion of safety), upon exceeding which the behavior of the file being executed will cease to be considered safe (on the graph, this threshold value is designated by a dotted line).

However, in time the malicious activity of the file being executed grows on account of the execution of a large number of "suspicious" commands and the degree of maliciousness begins to approach 1, while the degree of maliciousness might not reach the predetermined threshold value (hereinafter, the criterion of maliciousness) upon exceeding which the behavior of the file being executed will be considered to be malicious (on the graph, this threshold value is designated by a dashed line), and also it might not exceed the criterion of safety, so that the file will continue to be considered safe.

After a period of growth (times A-B), the malicious activity may cease (times B-A), yet the degree of maliciousness will not now decline, but only continue to grow during any malicious activity of the file being executed, yet not exceed the coefficient of safety, so that the activity of the file being executed will be considered to be safe and in consequence the file will be considered to be safe.

In the case when the degree of maliciousness is calculated not on the basis of each behavior pattern formed (for example, because the performance of the computing device is not high), a situation is possible where the degree of maliciousness will be calculated at time B (when the activity is most similar to malicious, i.e. becomes "suspicious") but will not be calculated at time A (when the "suspicious" activity is increasing) or at time C (when the "suspicious" activity is decreasing), nevertheless, since the degree of maliciousness changes monotonically, the calculated degrees of maliciousness will only increase their values, at times A, B, C the degrees of maliciousness will not exceed the criterion of safety, the activity of the file being executed will be recognized as safe, and consequently the safe file will be recognized as safe.

Furthermore, the time of recognizing the file as "suspicious" might not occur after the manifesting of "suspicious" activity, since the described approach affords to a smooth growth in the degree of maliciousness, which makes it possible to avoid sharp peaks in the growth of the degree of maliciousness.

Figure 4:
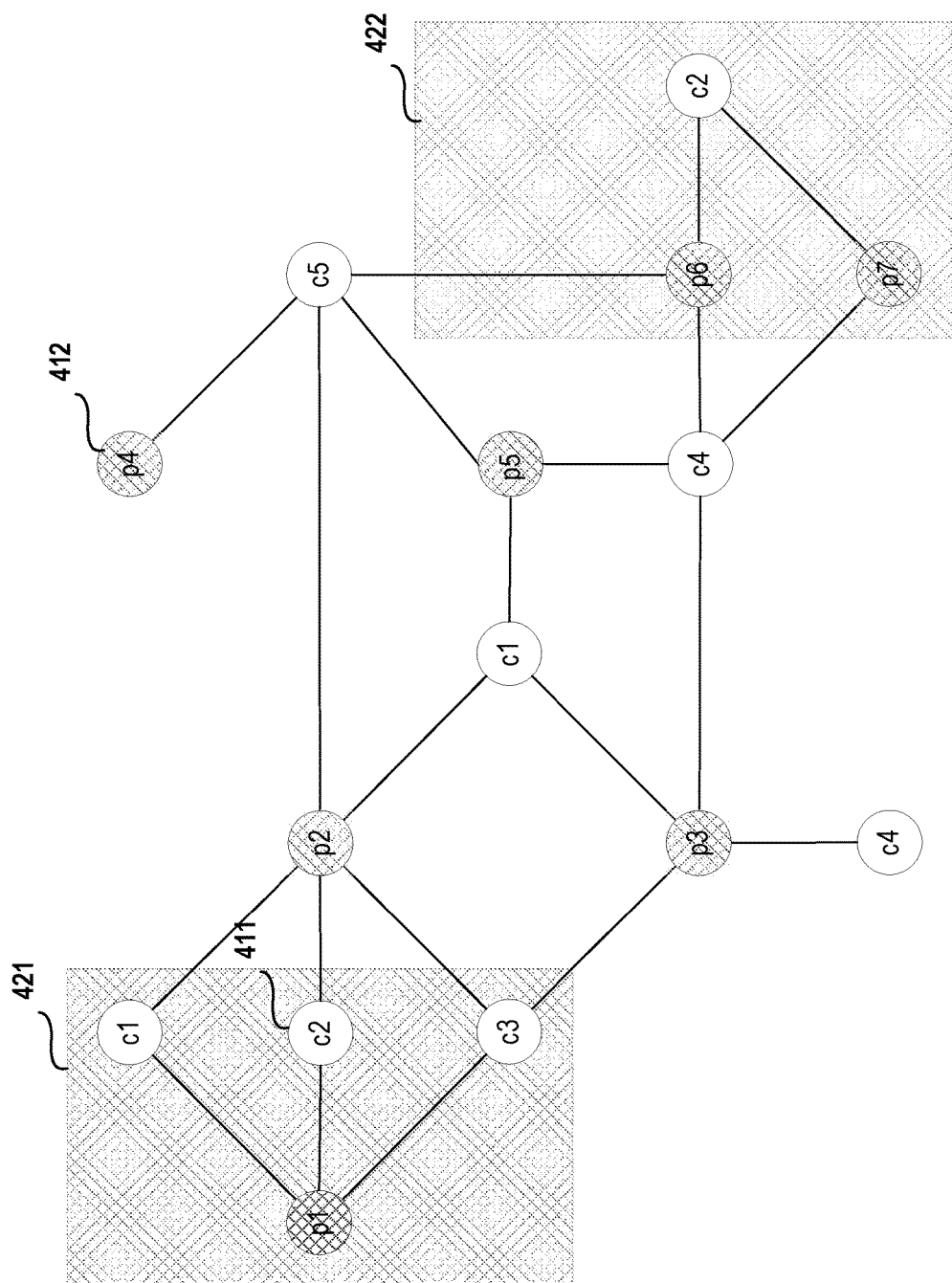
FIG. 4 shows an example of the diagram of relations between elements of behavior patterns, in accordance with exemplary aspects of the present disclosure.

FIG. 4 shows an example of the diagram of relations between elements of behavior patterns.

The example of the diagram of relations between elements of behavior patterns contains commands 411 (clear circles), parameters 412 (hatched circles), an example of a behavior pattern with one parameter 421, and an example of a behavior pattern with one command 422.

During the execution of a file, the commands 411 were intercepted and the parameters 412 describing them were determined:

CreateFile 0x24e0da54 '.dat'
    {c1, p1, p2}
ReadFile 0x24e0da54 '.dat'
    {c2, p1, p2}
DeleteFile 0x24e0da54 '.dat' 'c:\'
    {c3, p1, p2, p3}
CreateFile 0x708a0b32 '.dat' 0x3be06520
    {c1, p2, p3, p5}
WriteFile 0x708a0b32
    {c4, p3}
WriteFile      0x708a0b32      0x3be06520 0x9902a18d1718b5124728f9 0
    {c4, p3, p5, p6, p7}
CopyMemory 0x3be06520 0x9902a18d1718b5124728f9
    {c5, p4, p5, p6}
ReadFile 0x9902a18d1718b5124728f9 0
    {c2, p6, p7}

On the basis of said commands 411 and parameters 412, behavior patterns (421, 422) are formed and the relations between the elements of the behavior patterns are determined.

In a first step, patterns are formed which contain one command 411 and one parameter 412 describing that command:

{c1, p1} {c2, p2}
    {c1, p2} {c2, p6}

{c1, p3} {c2, p7}
{c1, p5} {c3, p1}
{c2, p1} {c3, p2}
{c3, p3}
{c4, p3}
{c4, p5}
{c4, p6}
{c4, p7}
{c5, p4}
{c5, p5}
{c5, p6}

In the example shown, 19 behavior patterns have been formed on the basis of 8 intercepted commands (with the parameters describing them).

In the second step, patterns are formed which contain one parameter 412 and all the commands 411 which can be described by that parameter 412:

{c1, c2, c3, p1}
{c1, c2, c3, p2}
{c1, c4, c5, p5}
{c2, c4, c5, p6}
{c1, c3, c4, p3}
{c5, p4}
{c2, c4, p7}

In the example shown, 7 behavior patterns have been formed in addition on the basis of 8 intercepted commands (with the parameters describing them).

In the third step, patterns are formed which contain several parameters 412 and all the commands 411 which can be described by those patterns 412:

{c1, c2, c3, p1, p2}
{c4, c5, p5, p6}
{c2, c4, p6, p7}

In the example shown, 3 behavior patterns have been formed in addition on the basis of 8 intercepted commands (with the parameters describing them).

Figure 5:
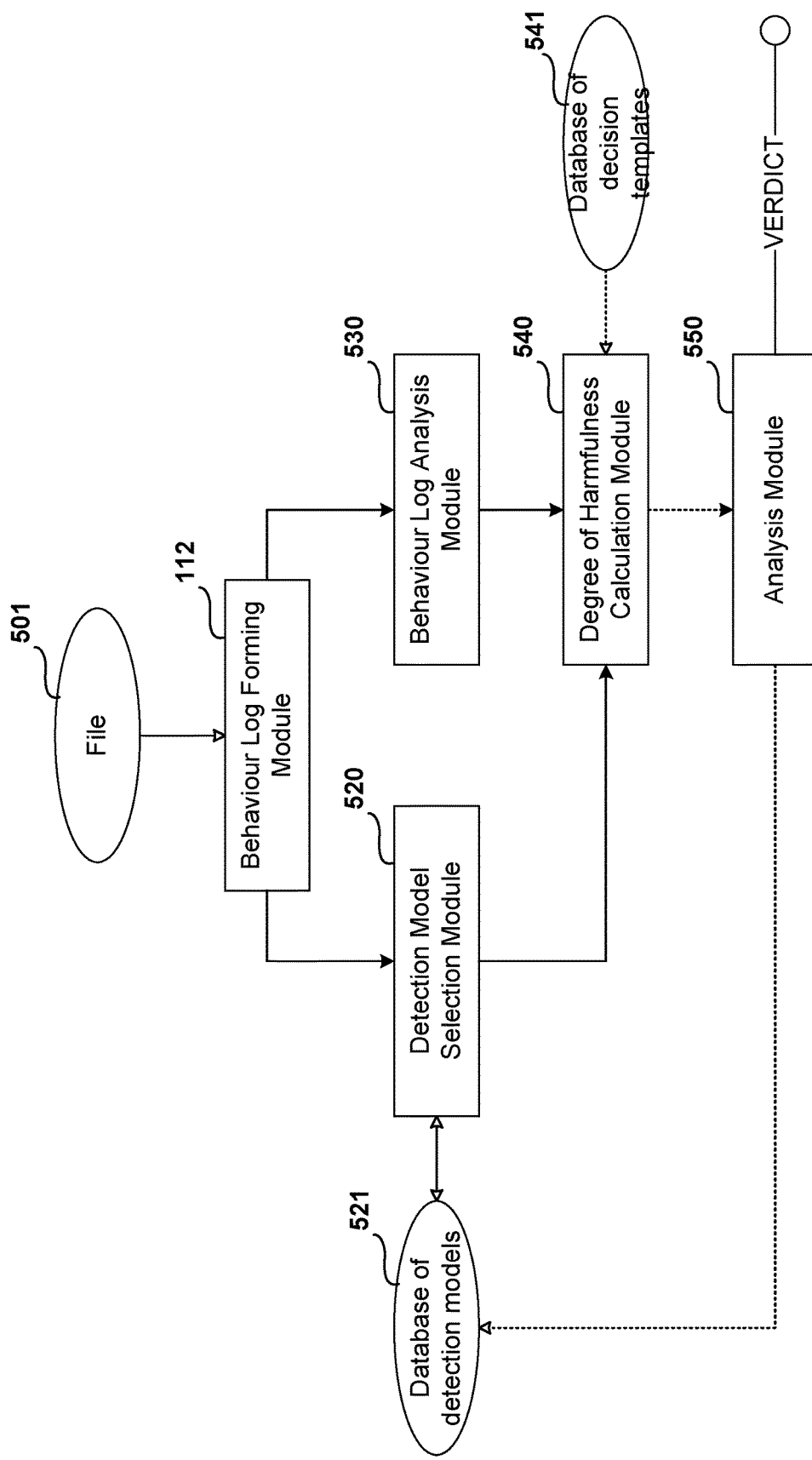
FIG. 5 shows the structural diagram of the system for detection of malicious files using a trained model for detection of malicious files, in accordance with exemplary aspects of the present disclosure.

FIG. 5 shows the structural diagram of the system of detection of malicious files using a trained model for detection of malicious files.

The structural diagram of the system of detection of malicious files using a trained model for detection of malicious files consists of the file being analyzed 501, a behavior log forming module 112, a detection model selection module 520, a database of detection models 521, a behavior log analysis module 530, a degree of maliciousness calculation module 540, a database of decision templates 541 and a analysis module 550.

In one variant aspect of the system, the system additionally contains a behavior log forming module 112 of the file being executed, which is designed to:
  intercept at least one command at least during:
    the execution of the file 501;
    the emulation of the execution of the file 501;
  determine for each intercepted command at least one parameter describing that command;
  form on the basis of the intercepted commands and the determined parameters a behavior log for that file, wherein the intercepted commands and the parameters describing them are recorded in the behavior log in chronological order from the earliest intercepted command to the most recent intercepted command (hereinafter, writing in the behavior log);
  send the formulated behavior log to the behavior log analysis module 530 and the detection model selection module 520.

In yet another variant aspect of the system, the behavior log is a set of executable commands (hereinafter: command) of the file 501, where each command corresponds to at least one parameter describing that command (hereinafter: parameter).

In yet another variant aspect of the system, the intercepting of commands of the file being executed 501 and the determination of the parameters of the intercepted commands is carried out on the basis of an analysis of the performance of the computing device on which the system for detecting malicious files using a trained model for detection of malicious files is running, which includes at least:
  determining whether it is possible to analyze the file being executed 501 for maliciousness (carried out with the aid of the behavior log analysis module 530, the degree of maliciousness calculation module 540 and the analysis module 550) up to the time when the next command is intercepted;
  determining as to whether the analysis of the file being executed 501 for maliciousness will result in a lowering of the computing resources of the aforementioned computing device below a predetermined threshold value, the resources of the computing device being at least:
    the performance of that computing device;
    the volume of free RAM of that computing device;
    the volume of free space on information storage media of that computing device (such as hard disks);
    the bandwidth of the computer network to which that computing device is connected.

In order to increase the performance of the system of detection of malicious files using a trained model for detection of malicious files it may be necessary to analyze a behavior log not containing all the executable commands of the file being executed 501, since the entire sequence of actions carried out to analyze the file 501 for maliciousness takes up more time than the interval between two consecutively executed commands of the file being executed 501.

For example, the commands of the file being executed 501 are carried out (and consequently also intercepted) every 0.001 s, but the analysis of the file 501 for maliciousness takes 0.15 s, so that all the commands intercepted during the aforementioned interval of time will be ignored, so that it is enough to intercept only every 150th command.

The detection model selection module 520 is designed to:
  select from the database of detection models 521 at least two models for detection of malicious files on the basis of the commands and parameters selected from the behavior log of the file being executed 501, the model for detection of malicious files being a decision-making rule for determining the degree of maliciousness;
  send all selected models for detection of malicious files to the degree of maliciousness calculation module 540.

In one variant aspect of the system, the models for detection of malicious files kept in the database of detection models 521 have been previously trained by the method of machine learning on at least one safe file and one malicious file.

The model for detection of malicious files is described in greater detail in FIG. 1 to FIG. 4.

In yet another variant aspect of the system, the method of machine learning by the detection model is at least the method of:
  gradient boosting on decision-making trees;
  decision-making trees;
  k-nearest neighbors;
  support vectors.

In yet another variant aspect of the system, the method of training the detection model ensures monotonic variation in the degree of maliciousness of the file depending on the variation in the number of behavior patterns formed on the basis of the analysis of the behavior log.

For example, the calculated degree of maliciousness of the file 501 may only increase monotonically or not change depending on the number of behavior patterns formed on the basis of the analysis of the behavior log of that file 501. At the start of the execution of the file 501, the number of behavior logs formed is slight, and the calculated degree of maliciousness of that file 501 differs little from 0; in time, the number of patterns formed increases and the calculated degree of maliciousness of that file 501 also increases, or if there is no malicious activity of that file 501, the calculated degree of maliciousness remains unchanged; thus, whenever the degree of maliciousness of the file is calculated during the execution of a malicious file 501 (or from whatever record of the behavior log the forming of the behavior patterns begins), it will reflect whether malicious activity of the file 501 has occurred or not up to the time of calculation of said degree of maliciousness.

In yet another variant aspect of the system, each model for detection of malicious files selected from the database of detection models 521 is trained to detect malicious files with predetermined unique characteristic features.

For example, the detection models kept in the database of detection models 521 may be trained to detect files:
- which have a GUI—graphical user interface;
- which exchange data in a computer network;
- which encrypt files (such as malicious files of the "Trojan-Cryptors" family);
- which use for their propagation network vulnerabilities (such as malicious files of the "Net-Worms" family), P2P networks (such as malicious files of the "P2P-Worms" family), and so forth.

Thus, a malicious file may be detected using several trained models for detection of malicious files. For example, the malicious file "WannaCry.exe", which during its execution encrypts data on a user's computing device and sends copies of itself to other computing devices connected to the same computer network as the user's computing device on which it is being executed, can be detected with the aid of detection model #1, trained to detect files utilizing vulnerabilities, detection model #2, trained to detect files designed to encrypt files, and detection model #3, trained to detect files containing text information interpretable as demands being made (for example, as to a form of payment, sums of money, and so forth). Furthermore, the degrees of maliciousness calculated with the aid of those models, as well as the times when the calculated degrees of maliciousness exceed the predetermined threshold value, might differ from each other. For example, the results of using the models for detection of malicious files with the aid of which the malicious file 501 was successfully detected may be expressed in the following table:

TABLE #1

| detection model | maximum degree of maliciousness | command no. from behavior log |
|---|---|---|
| model #1 | 0.95 | 374 |
| model #2 | 0.79 | 288 |
| model #3 | 0.87 | 302 |

File 501 is recognized as malicious in the event that the calculated degree of maliciousness is greater than 0.78.

Furthermore, the degree of maliciousness (such as 0.78) characterizes the probability that the file for which the degree of maliciousness has been calculated may prove to be malicious (78%) or safe (22%). If the file 501 can be recognized as being malicious using several models for detection of malicious files, then there is a higher probability that the file 501 will prove to be malicious. For example, for the models for detection of malicious files the data of which is presented in Table #1, the summary degree of maliciousness can be calculated by the formula $$w_{total} = 1 - \Pi_i^n (1-w_i) = 0.999685,$$

where
- $w_{total}$ is the summary degree of maliciousness,
- $w_i$ is the degree of maliciousness calculated using model i,
- n is the number of models for detection of malicious files used to calculate the summary degree of maliciousness.

Thus, the obtained summary degree of maliciousness (0.999685) is significantly higher than the predetermined threshold value for which a file is recognized as malicious when its calculated degree of maliciousness exceeds that threshold (0.78). That is, the use of several models for detection of malicious files allows substantially higher accuracy of determination of malicious files, and fewer errors of the first and second kind occurring during detection of malicious files.

In yet another example, the use of several models for detection of malicious files allows the summary degree of maliciousness to attain the predetermined threshold value for which a file is recognized as malicious when its calculated degree of maliciousness exceeds that threshold much sooner than when using each of the models for detection of malicious files separately. For example, for the models for detection of malicious files the data of which are presented in Table #1, given that the calculated degrees of maliciousness vary monotonically, the number of the command from the behavior log after which the file will be recognized as malicious can be calculated by the formula $$I_{detect} = \Pi_i^n F(w_i, I_i) = 207,$$

where
- $I_{detect}$ is the number of the command from the behavior log after analysis of which the file is recognized as malicious,
- $I_i$ is the number of the command from the behavior log after analysis of which the file is recognized as malicious using the model i,
- $w_i$ is the degree of maliciousness calculated using the model i,
- n is the number of models for detection of malicious files used to calculate the number of the command from the behavior log after analysis of which the file is recognized as malicious.

Thus, the obtained summary number of the command from the behavior log (207) is much lower than the earliest number of the command from the behavior log (288) after analysis of which the file was recognized as malicious by one of the models for detection of malicious files (model #2). That is, the use of several models for detection of malicious files makes it possible to substantially increase the speed (i.e. the efficiency) of determination of malicious files.

In yet another example, the different detection models kept in the database of detection models 521 may be trained to detect malicious files with several not necessarily unique predetermined characteristic features, i.e. detection model

1 can detect files having a graphical user interface and exchanging data in a computer network, while model #2 can detect files exchanging data in a computer network and propagating in that computer network using network vulnerabilities. Both of those detection models can detect the aforementioned malicious file "WannaCry.exe" thanks to the common characteristic feature of the file propagating in a computer network using network vulnerabilities.

In yet another variant aspect of the system, a model for detection of malicious files selected from the database of detection models 521 that was trained on files during the execution of which at least:
- the same commands were executed as the commands selected from the behavior log of the file being executed 501;
- the same parameters were used as the parameters selected from the behavior log of the file being executed 501.

For example, the commands "CreateFileEx", "ReadFile", "WriteFile", and "CloseHandle" were selected from the behavior log, which are used for the modification of files, including the encryption of files. A detection model trained for use in detecting malicious files of the "Trojan-Cryptors" family is selected from the database of detection models 521.

In yet another example, the parameters "8080" and "21" were selected from the behavior log, which describe commands for working with a computer network (for example, connect, where the above-described parameters are the connection ports to the electronic address). A detection model trained for use in detecting files which ensure exchange of data in a computer network is selected from the database of detection models 521.

The behavior log analysis module 530 is designed to:
- form at least one behavior pattern on the basis of the commands and parameters selected from the behavior log of the file being executed 501, wherein the behavior pattern is a set of at least one command and a parameter which describes all the commands from that set;
- calculate the convolution of all the behavior patterns formed;
- send the formed convolution to the degree of maliciousness calculation module 540 of the file being executed.

In one variant aspect of the system, the calculation of the convolution of the formed behavior patterns is based on a predetermined convolution function, such that the inverse convolution function of the result of that convolution function performed on all of the formed behavior patterns has a degree of similarity to that behavior pattern greater than a predetermined threshold value.

The formation and use of the convolution functions (calculation of the convolution) is described more closely in FIG. 1 and FIG. 2.

The degree of maliciousness calculation module 540 is designed to:
- calculate the degree of maliciousness of the file being executed 501 on the basis of an analysis of the obtained convolution with the aid of each obtained model for detection of malicious files;
- send each calculated degree of maliciousness to the analysis module 550.

In one variant aspect of the system, the decision making template is a composition of the degrees of maliciousness.

For example, the composition of the degrees of maliciousness calculated on the basis of models #1, #2, #3, described above, can be represented as an aggregate of pairs {0.95, 374}, {0.79, 288}, {0.87, 302}.

In yet another example, the composition of the degrees of maliciousness calculated on the basis of models #1, #2, #3, described above, can represent a measure of the central tendency of the calculated degrees of maliciousness (such as the arithmetic mean, in the given case 0.87).

In yet another example, the composition of the degrees of maliciousness represents the change in the degrees of maliciousness as a function of time or the number of behavior patterns used to calculate the degree of maliciousness.

The analysis module 550 is designed to:
- form a decision making template on the basis of the obtained degrees of maliciousness;
- recognize the file being executed 501 as malicious in the event that the degree of similarity between the formed decision making template and at least one of the predetermined decision making templates from the database of decision making templates 541, previously formed on the basis of an analysis of malicious files, exceeds a predetermined threshold value.

In one variant aspect of the system, the decision making template is an aggregate of the degrees of maliciousness obtained from the degree of maliciousness calculation module 540.

In yet another variant aspect of the system, the decision making template is the degree of maliciousness as a function of time or the number of behavior patterns used to calculate that degree of maliciousness.

In yet another variant aspect of the system, the decision making templates from the database of decision making templates 541 are formed on the basis of an analysis of malicious files which were used for the training of models from the database of detection models 521.

For example, on the basis of 100,000 files, of which 75,000 are safe files and 25,000 are malicious files, the detection models are trained (including testing) and then saved in the database of detection models 521. After the models for detection of malicious files have been trained, they are used to form the decision making templates for certain (or all) of the aforementioned 25,000 malicious files, which are then entered into the database of decision making templates 541. That is, machine learning by the models for detection of malicious files is first carried out on a learning and testing sample of files. As a result, several models for detection of malicious files can be trained, each of which will be trained for the detection of malicious files with unique predetermined characteristic features. After all of the detection models have been trained, it is determined which ones of the trained models for detection of malicious files detect certain malicious files (in the above-described example, the 25 000 malicious files); it may turn out that one malicious file can be detected using one set of models for detection of malicious files, another one using another set of models for detection of malicious files, a third one using several models for detection of malicious files from the aforementioned sets of models for detection of malicious files. The decision making templates are formed on the basis of the data obtained as to which models for detection of malicious files can be used to detect which malicious files.

In yet another variant aspect of the system, the analysis module 550 is additionally designed to retrain at least one detection model from the database of detection models 521 on the basis of commands and parameters selected from the behavior log of the file being executed 501 in the case when the degree of similarity between the formed decision making template and at least one of the predetermined decision making templates from the database of decision making templates 541 exceeds a predetermined threshold value, while the degrees of maliciousness calculated with the aid of the aforementioned models for detection of a malicious file do not exceed a predetermined threshold value.

Figure 6:
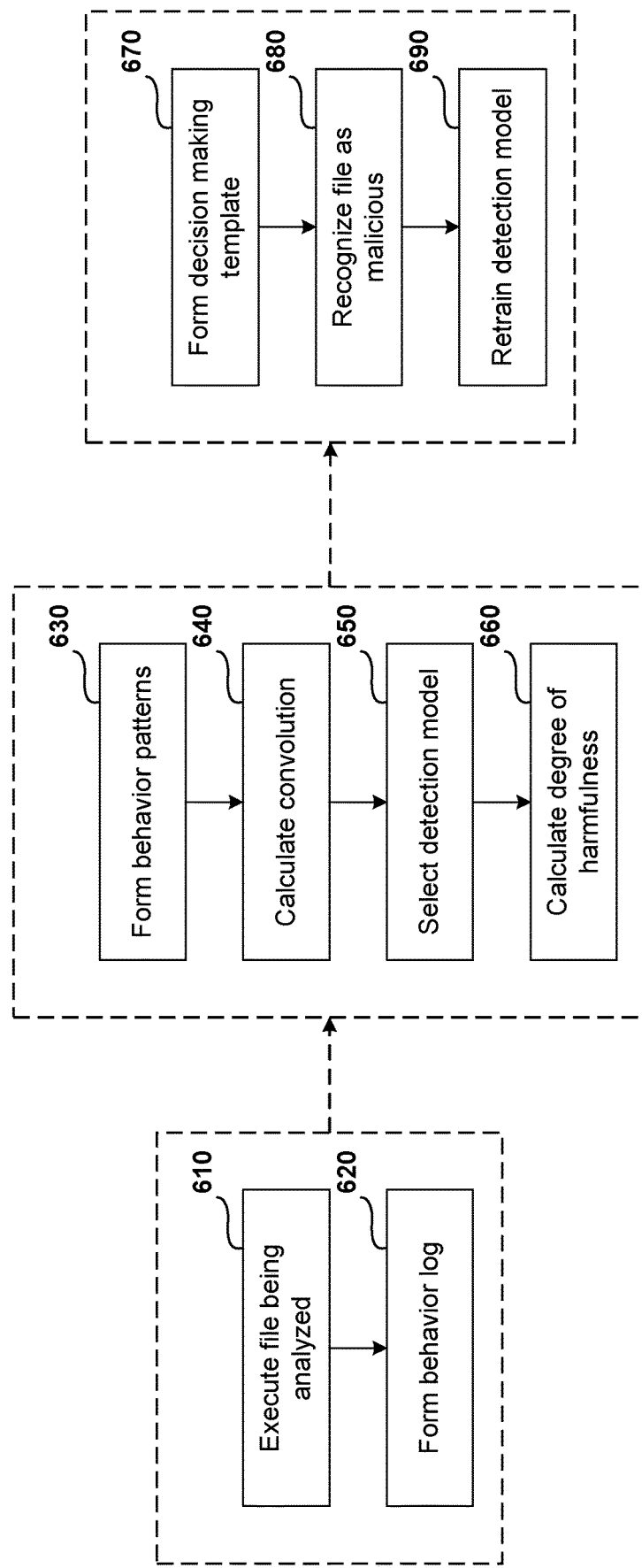
FIG. 6 shows the structural diagram of the method for detection of malicious files using a trained model for detection of malicious files, in accordance with exemplary aspects of the present disclosure.

FIG. 6 shows the structural diagram of the method for detection of malicious files using a trained model for detection of malicious files.

The structural diagram of the method for detection of malicious files using a trained model for detection of malicious files contains a step 610, in which the file being analyzed is executed, a step 620, in which a behavior log is formed, a step 630, in which behavior patterns are formed, a step 640, in which the convolution is calculated, a step 650, in which a detection model is selected, a step 660, in which the degree of maliciousness is calculated, a step 670, in which a decision making template is formed, a step 680, in which the file is recognized as malicious, and a step 690, in which the detection model is retrained.

In step 610, the behavior log forming module 112 is used to at least:
execute the file being analyzed 501; or
emulate the execution of the file being analyzed 501.

In step 620, the behavior log forming module 112 is used to form a behavior log for the file being analyzed 501, for which:
at least one command being executed is intercepted;
for each intercepted command at least one parameter is determined describing that command;
the behavior log of said file 501 is formed on the basis of the intercepted commands and the parameters so determined.

In step 630, the behavior log analysis module 530 is used to form at least one behavior pattern on the basis of the commands and parameters selected from the behavior log of the file being executed 501, the behavior pattern being a set of at least one command and a parameter which describes all the commands from that set.

In step 640, the behavior log analysis module 530 is used to calculate the convolution of all the behavior patterns formed in step 630.

In step 650, the detection model selection module 520 is used to select from the database of detection models 521 at least two detection models for malicious files on the basis of the commands and parameters selected from the behavior log of the file being executed 501, the model for detection of malicious files being a decision making rule for determining the degree of maliciousness.

In step 660, the degree of maliciousness calculation module 540 is used to calculate the degree of maliciousness of the file being executed 501 on the basis of an analysis of the convolution calculated in step 640 with the aid of each model for detection of malicious files selected in step 650.

In step 670, the analysis module 550 is used to form a decision making template on the basis of the degrees of maliciousness obtained in step 660;

In step 680, the analysis module 550 is used to recognize the file being executed 501 as malicious in the event that the degree of similarity between the decision making template formed in step 670 and at least one of the predetermined decision making templates from the database of decision making templates 541 exceeds a predetermined threshold value.

In step 690, the analysis module 550 is used to retrain at least one detection model from the database of detection models 521 on the basis of the commands and parameters selected from the behavior log of the file being executed, in the event that the degree of similarity between the formed decision making template and at least one of the predetermined decision making templates from the database of decision making templates 541 exceeds a predetermined threshold value, while the degrees of maliciousness calculated with the aid of the aforementioned models for detection of a malicious file do not exceed a predetermined threshold value.

Figure 7:
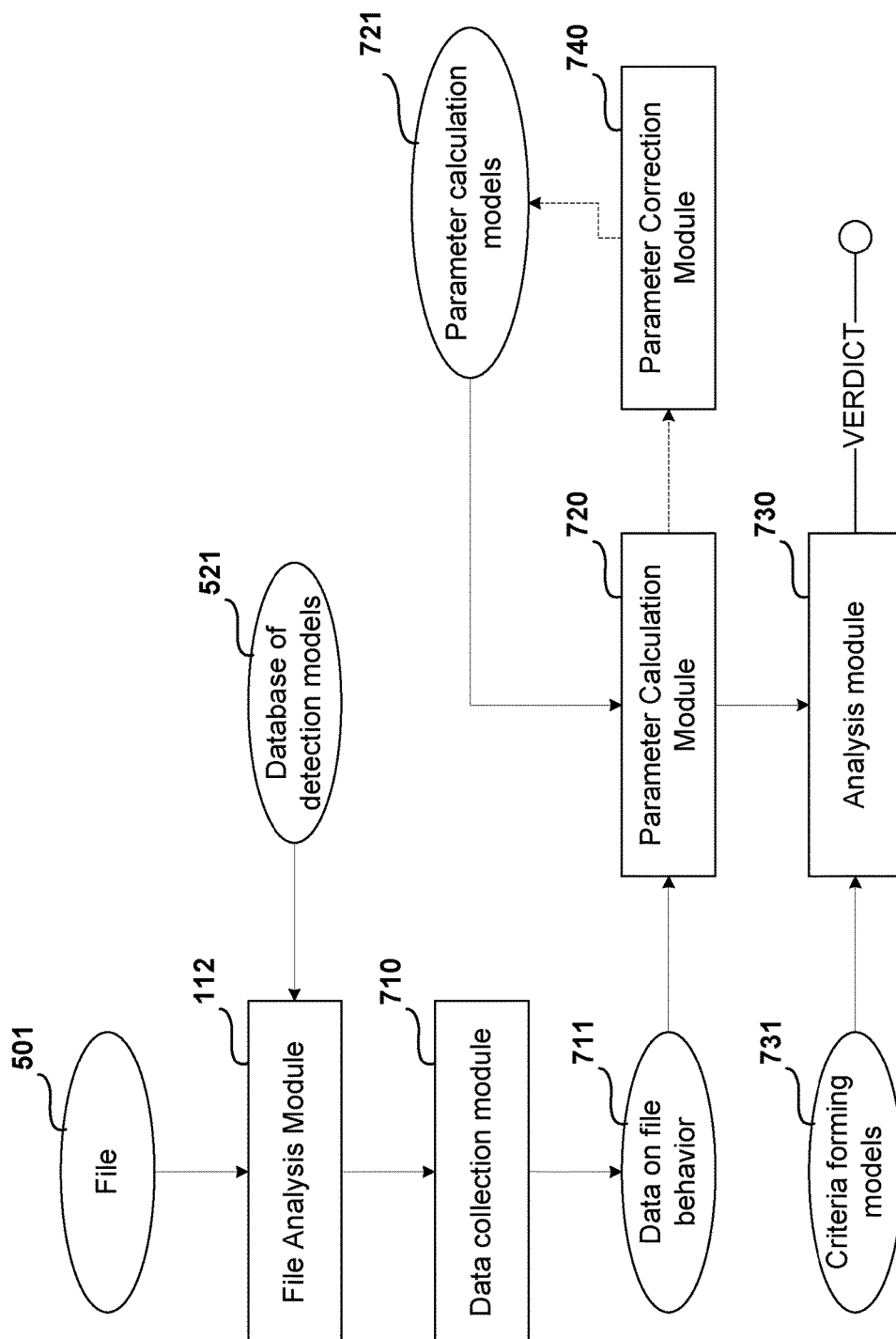
FIG. 7 shows the structural diagram of the method for detection of a malicious file, in accordance with exemplary aspects of the present disclosure.

FIG. 7 shows an example of the system for detection of a malicious file.

The structural diagram of the system for detection of a malicious file consists of the file being analyzed 501, a file analysis module 112, a database of detection models 521, a data collection module 710, data about the behavior 711 of the file 501, a parameter calculating module 720, a parameter calculation model 721, an analysis module 730, a criterion forming model 731, and a parameter correction module 740.

A more detailed description of the file analysis means 112, the file 501, the database of detection models 521, and the analysis module 730 (as a variant aspect of the analysis module 550) is disclosed in FIG. 1, FIG. 2, FIG. 5 and FIG. 6.

The data collection module 710 is designed to form, based on data about the execution behavior 711 of the file 501 gathered by the file analysis module 112, a vector of features which characterize that behavior, wherein the vector of features is a convolution of the collected data 711, formed as an aggregate of numbers.

An example of the forming of the convolution of the collected data is presented in the description of the working of the behavior pattern forming module 121 in FIG. 1.

In one variant aspect of the system, the data on the execution behavior 711 of the file 501 includes at least:
the commands contained in the file being executed 501 or interpretable in the process of execution of the file 501, the attributes being transmitted to those commands, and the values being returned;
data on the areas of RAM, which can be modified during the execution of the file 501;
the static parameters of the file 501.

For example, the commands may be either instructions (or groups of instructions) of the computer's processor or WinAPI functions or functions from third-party dynamic libraries.

In yet another example, the file 501 may contain raw data which is interpreted in the course of the execution of the file 501 as processor commands (or commands of a certain process, as in the case of dll libraries) and/or parameters being transferred to the commands. In a particular case, such data can be portable code.

In yet another example, the data of RAM areas may be:
the convolutions of those memory areas (for example, using fuzzy hashes);
the results of lexical analysis of those memory areas, on the basis of which lexemes are extracted from the memory area and statistics are gathered on their use (for example, the frequency of use, the weighting characteristics, relations to other lexemes, and so on);
static parameters of those memory areas, such as size, owner (process), rights of use, and so forth.

The static parameters of the file 501 are parameters which characterize the file (identify it) and which remain unchanged in the course of the execution, the analysis, or the modification of that file 501, or which characterize the file 501 up to the time of its execution.

In a particular instance, the static parameters of the file 501 may contain information about the characteristics of its execution or behavior (i.e. making it possible to predict of the result of the execution of the file 501).

In yet another example, the static parameters of the file are the size of the file, the time of its creation or modification, the owner of the file, the source from which the file was obtained (electronic or IP address), and so forth.

In yet another variant aspect of the system, data on the execution behavior 711 of the file 501 is gathered from various sources (input data channels), including at least:
- the log of commands executed by the file being analyzed 501;
- the log of commands executed by the operating system or applications being executed under the control of the operating system (except for the file being analyzed 501);
- data obtained through the computer network.

The parameter calculation module 720 is designed to calculate, on the basis of the feature vector formed by the data collection module 710 and using the trained parameter calculation model 711, the degree of maliciousness, being a numerical value characterizing the probability that the file 501 may prove to be malicious, and the limit degree of safety, being a numerical value characterizing the probability that the file 501 will definitely be safe when predetermined conditions are met which depend on the degree of maliciousness and the limit degree of safety (see FIG. 9), the collection of said degrees calculated in succession being described by a predetermined time law.

In one variant aspect of the system, for each channel of input data (source of input data or data from a source of output data filtered by a predetermined criterion) a system is created for extraction of features (of a vector of real numbers of length N):
- if the given channel involves the consecutive obtaining of information (for example, a log or sequence of unpacked file being executed), then a system is additionally created for aggregation of the features for the input sequence into a single vector;
- a system is created to transform the features from the given channel into a new vector of length K. Furthermore, the values in this vector may only increase monotonically as new elements of the input sequence are processed.

In yet another variant aspect of the system, the system for extraction, aggregation and transforming of features may depend on parameters for training, which will be attuned later on in the step of training the entire model:
- vectors of length K, arriving from all active channels, are monotonically aggregated into 1 vector of fixed length (for example, the maximum is taken element by element);
- the aggregated monotonically increasing vector is transformed into 1 real number, characterizing the suspicious nature of the process being investigated (for example, the vector is transformed by addition of elements of that vector or by performing actions on the elements of the vector according to a predetermined algorithm, such as by calculating the norm of that vector).

In yet another variant aspect of the system, the parameter calculation model 721 has been previously trained by the method of machine learning on at least one safe file and one malicious file.

In yet another variant aspect of the system, the method of machine learning by the model for calculation of parameters 721 is at least the method of:

- gradient boosting on decision-making trees;
- decision-making trees;
- k-nearest neighbors;
- support vectors.

In yet another variant aspect of the system, at least the degree of maliciousness or limit degree of safety being calculated depend respectively on the degree of maliciousness and limit degree of safety calculated at the time of launching of the file 501 on the basis of an analysis of the static data of the file 501.

For example, the degree of maliciousness and the limit degree of safety may be calculated by the formulas:

$$\omega = \omega_0 + \omega(t)$$

$$\varphi = \varphi_0 + \varphi(t)$$

where
- $\omega$, $\varphi$ are the degree of maliciousness and the limit degree of safety, respectively,
- $\omega_0$, $\varphi_0$ are the starting values of the degree of maliciousness and the limit degree of safety not depending on the execution parameters of the file 501, but depending on external conditions (the working parameters of the operating system and so forth),
- $\omega(t)$, $\varphi(t)$ are the time laws used to calculate the degree of maliciousness and the limit degree of safety, respectively.

Furthermore, said time laws may be dependent on each other, i.e. on the previously calculated degree of maliciousness and limit degree of safety:

$$\omega(t_n) = \omega(t, \varphi(t_{n-1}))$$

$$\varphi(t_n) = \varphi(t, \omega(t_{n-1}))$$

Figure 9:
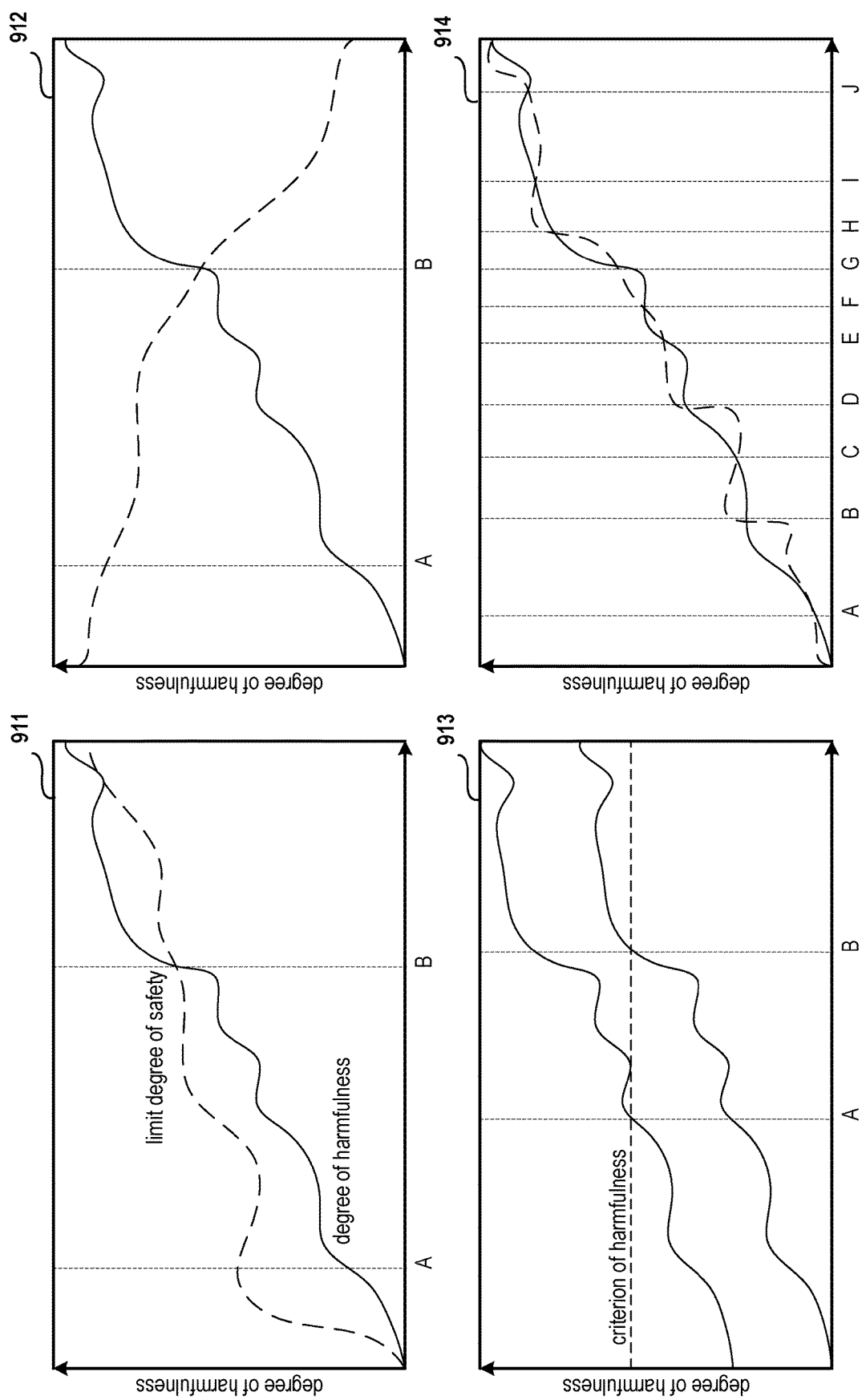
FIG. 9 shows examples of the dynamics of change in the degree of maliciousness and the limit degree of safety as a function of the number of behavior patterns, in accordance with exemplary aspects of the present disclosure.
Figure 10:
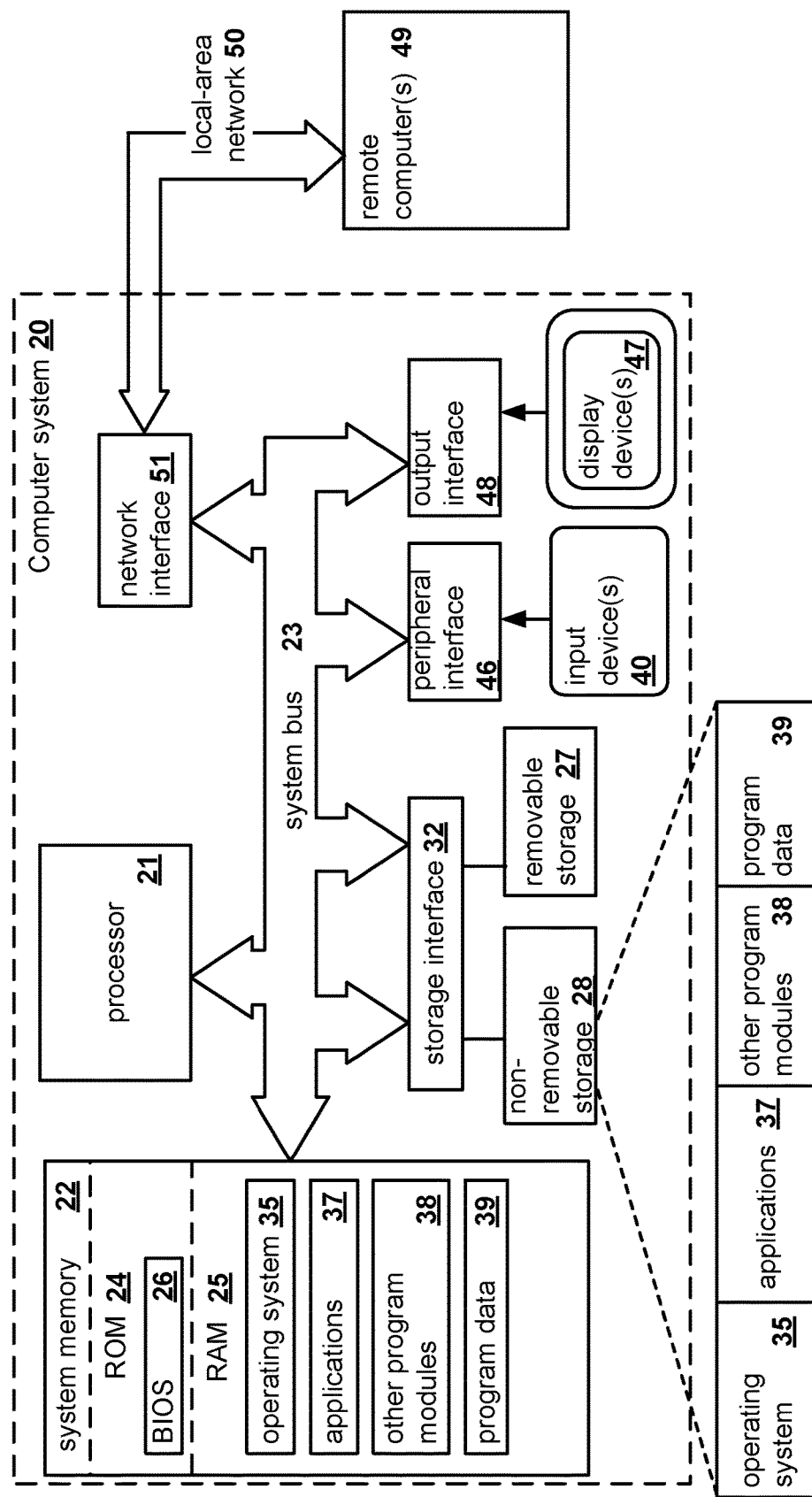
FIG. 10 shows an example of a general-purpose computer system, a personal computer or a server, in accordance with exemplary aspects of the present disclosure.

The above-described variant aspect of the system is disclosed in more detail in FIG. 9.

In yet another variant aspect of the system, the trained parameter calculation model 721 is a collection of rules for calculating the degree of maliciousness of the file and the limit degree of safety of the file, which depend on the data found about the execution behavior 711 of the file 501.

In yet another variant aspect of the system, the time laws describing the group of consecutively calculated degrees of maliciousness and the group of consecutively calculated limit degrees of safety are monotonic in nature.

For example, the curve of the degree of maliciousness as a function of time may be described by a monotonically increasing function (such as $f(x) = ax + b$).

In yet another variant aspect of the system, the time laws describing the group of consecutively calculated degrees of maliciousness and the group of consecutively calculated limit degrees of safety have a piecewise monotonic nature, i.e. they have a monotonic nature in specified time intervals.

Often during the working of the system being described it is not possible (due to limitations on the computing resources, the computer time, the demands on minimal performance, etc.) to determine constantly (continuously or with a given periodicity) the degree of maliciousness, and therefore the degree of maliciousness and the limit degree of safety may be calculated on calculable intervals of time (not predetermined ones, but which can be calculated in the process of execution of the file 501). Such calculations are also based on certain predetermined time laws, for which the input parameters are calculated in the process of execution of the file, i.e. it is possible to write for the time of calculation of the file:

$$t_n = \tau(t_{n-1})$$

Furthermore, the time of calculation of the degree of maliciousness and the limit degree of safety may depend on the previously calculated degree of maliciousness and the limit degree of safety:

$$t_n = \tau(t_{n-1}, \omega(t_{n-1}), \varphi(t_{n-1}))$$

For example, when the file 501 is launched, for the first 10 seconds the degree of maliciousness of that file increases monotonically; after the 10th second, the degree of maliciousness of that file is cut in half, and then it begins to increase monotonically once again.

The analysis module 730 is designed to make a decision on the detection of a malicious file 501 in the event that the data collected on the execution behavior 711 of the file 501 meets a predetermined criterion for the determination of maliciousness, formulated on the basis of the degree of maliciousness and the limit degree of safety as calculated by the parameter calculation module 720, wherein that criterion is a rule for the classification of the file (provided by the criterion forming model 731) in terms of an established correlation between the degree of maliciousness and the limit degree of safety.

In one variant aspect of the system, the correlation between the degree of maliciousness and the limit degree of safety is at least:
- the difference from a predetermined threshold value of the distance between the degree of maliciousness and the boundary conditions of maliciousness;
- the difference from a predetermined threshold value of the areas bounded in a given time interval between curves describing the degree of maliciousness and the limit degree of safety;
- the difference from a predetermined value of the rate of mutual increase of the curve describing the degree of maliciousness and the boundary conditions of maliciousness as a function of time.

For example, the most characteristic instances of the described correlation are depicted in FIG. 9.

The parameter correction module 740 is designed to retrain the parameter calculation model 721 on the basis of an analysis (see FIG. 9) of the calculated degree of maliciousness and limit degree of safety, as a result of which changes in the time laws describing the degree of maliciousness and the limit degree of safety cause the correlation between the values obtained on the basis of those time laws tend toward a maximum.

In one variant aspect of the system, the parameter calculation model 721 is retrained so that, when the model is used, the criterion formed afterwards ensures at least:
- that the accuracy of determining the degree of maliciousness and the limit degree of safety is greater than when using an untrained parameters calculation model;
- the utilization of the computing resources is lower than when using an untrained parameter calculation model.

For example, after the retraining (or further training), the correlation factor between the values of the curves of the degree of maliciousness and the limit degree of safety becomes larger (tending toward 1).

As a result, under constant retraining of the parameter calculation model 721 the probability of occurrence of errors of the first and second kind (false positives) constantly diminishes. Furthermore, the use of the various retraining criteria presented above ensures that the system for detection of a malicious file with a retrained model 721 has a very high rate of decrease in the errors of the first and second kind at the start (in the initial stages of the retraining), so that with few retraining iterations of the parameter calculation model 721 the effectiveness of the system for detection of a malicious file increases sharply, tending toward 100%.

Figure 8:
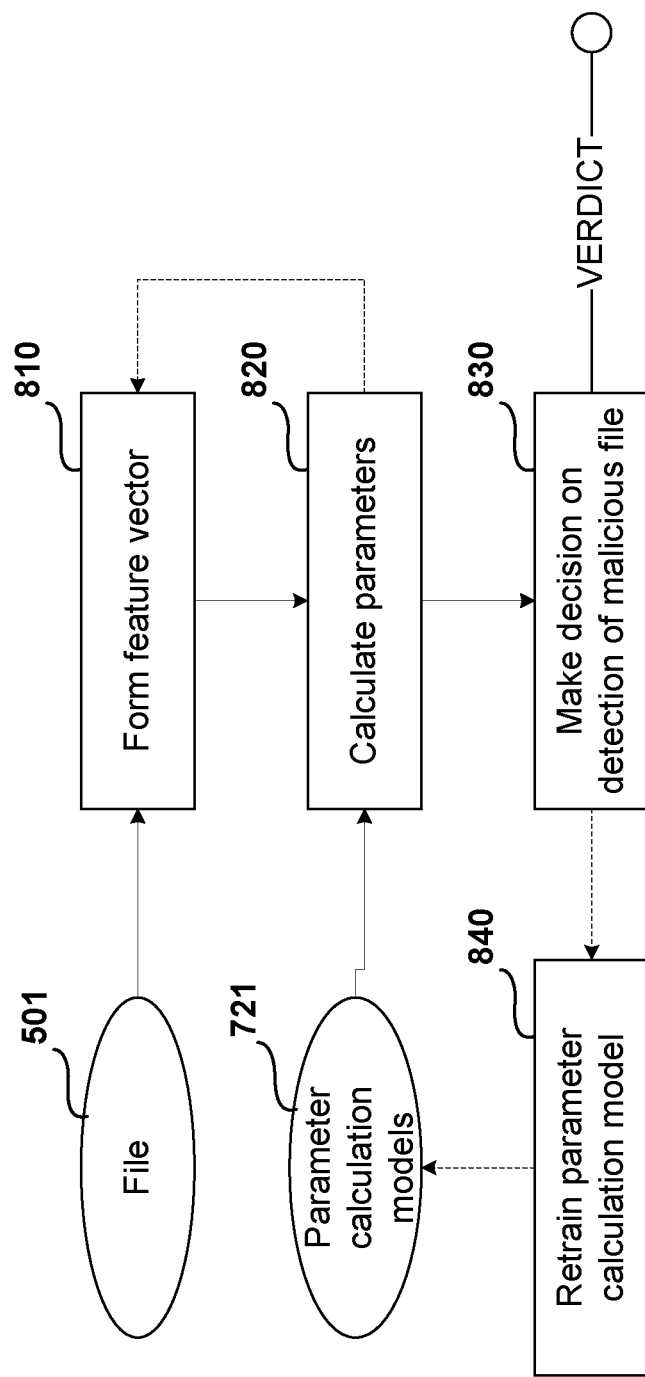
FIG. 8 shows the structural diagram of the method for detection of a malicious file, in accordance with exemplary aspects of the present disclosure.

FIG. 8 shows an example of the method for detection of a malicious file.

The structural diagram of the method for detection of a malicious file contains a step 810, in which the feature vector is formed, a step 820, in which the parameters are calculated, a step 830, in which a decision is made as to the detection of a malicious file, and a step 840, in which the parameter calculation model.

In step 810, a vector of the features characterizing the execution behavior of the file is formed on the basis of the data gathered about the execution behavior 711 of the file 501, the feature vector being a convolution of the gathered data in the form of an aggregate of numbers.

In step 820, on the basis of the feature vector so formed and using the trained parameter calculation model 721, the degree of maliciousness, being a numerical value characterizing the probability that the file 501 may prove to be malicious, and the limit degree of safety, being a numerical value characterizing the probability that the file 501 will definitely prove to be malicious, are calculated, wherein the group of said consecutively calculated degrees is described by a predetermined time law.

Steps 810-820 are carried out for different consecutive time intervals of execution of the file being analyzed 501.

In step 830, a decision is made as to the detection of a malicious file 501 in the event that the data gathered on the execution behavior 711 of the file 501 satisfies a predetermined criterion for determination of maliciousness (see FIG. 9), formulated on the basis of the degree of maliciousness and the limit degree of safety as calculated in step 820, said criterion being a rule for classification of the file according to an established correlation between the degree of maliciousness and the limit degree of safety.

In step 840, the parameter calculation model 721 is additionally retrained on the basis of an analysis of the calculated degree of maliciousness and limit degree of safety, as a result of which changes in the time laws describing the degree of maliciousness and the limit degree of safety result in the correlation between the values obtained on the basis of those laws tending toward a maximum.

FIG. 9 shows examples of the dynamics of change in the degree of maliciousness and the limit degree of safety as a function of the number of behavior patterns:

In diagram 911 a situation is illustrated in which an increase in the degree of maliciousness of the file being analyzed 501 is observed over time (essentially as the number of behavior patterns formulated increases). Furthermore, an increase is likewise observed in the limit degree of safety (the general case of the criterion of maliciousness shown in FIG. 3).

A decision as to the detection of a malicious file 501 is made if the degree of the malicious file 501 begins to exceed the limit degree of safety of the file 501 (point 911.B).

Such a situation is observed in the event that "suspicious" activity is registered both during the execution of the file 501 and upon analysis of the condition of the operating system as a whole. Thus, a decrease in the probability of occurrence of an error of the first kind is achieved. Even though suspicious activity is registered in the working of the system (i.e. activity not yet able to be considered malicious, but also already not able to be considered safe, for example, archive packing with subsequent deletion of the initial files), that activity is considered when calculating the degree of maliciousness of the file 501 in such a way that the giving of a positive verdict as to the detection of a malicious file is not based for the most part on the suspicious activity in the working of the system rather than during the execution of the file 501, i.e. the contribution of the execution activity of the file 501 to the final decision on recognizing the file 501 as malicious should be greater than the contribution of the system activity.

For example, a similar situation may be observed when a user performs an archiving of data on the computer, resulting in a repeated reading of data from the hard disk and subsequent renaming or deletion of files, which might be considered suspicious activity of the working of malicious encryption programs for the system of an ordinary user (such as an office worker), since such activity (based on statistical data obtained from users) is observed very seldom if at all for those users.

For example, a standard antivirus application may during the analysis of the activity of software on a user's computer issue warnings (not undertaking any active measures) that a particular application is behaving "suspiciously", i.e. the behavior of that application does not conform to predetermined rules of the antivirus application. But the described system does not operate by predetermined rules, and instead dynamically assesses the change in activity, resulting for a malicious, yet unknown file 501 in recognition detection of the file as malicious).

In yet another example, the change in activity upon execution of a file 501 may be a consequence of the transmission of data in a computer network, depending on the characteristics of the data being transmitted (frequency, quantity, and so forth), which may indicate that malicious activity is taking place (for example, a remote administration (backdoor) malicious program is running). The longer such activity goes on, the higher the chance of it being recognized as malicious, since it differs noticeably from typical network activity on the user's computer.

In diagram 912 a situation is depicted in which an increase in the degree of maliciousness of the file being analyzed 501 and a decrease in the limit degree of safety is observed over time.

The decision as to the detection of a malicious file 501 is made if the degree of the malicious file 501 begins to exceed the limit degree of safety of the file 501 (point 912.B).

Such a situation is observed in the event, which is the converse of that described in diagram 911, that no "suspicious" activity is observed during the analysis of the condition of the operating system. Thus, a decrease is achieved in the probability of occurrence of an error of the second kind (overlooking a malicious file). Suspicious activity influences the giving of an affirmative verdict as to the detection of a malicious file "more strongly" if the rest of the behavior during the execution of the file in particular or the operating system as a whole does not look "suspicious".

For example, such a situation may be observed during the working of remote administration malicious programs on the user's computer, as a result of which programs the malicious activity appears only episodically, that is, every subsequent episode should be analyzed more "closely", i.e. the criterion after which the activity will be considered malicious should decrease constantly. But in the event that trusted applications begin being executed on the user's computer, the behavior of which might be considered suspicious but is not considered such on account of the applications being trusted (i.e. previously checked for maliciousness), then the limit degree of maliciousness may be increased, which will protect against recognizing the behavior of legitimate files as malicious and merely postpone the detecting of malicious behavior of a malicious file.

In diagram 913 a situation is depicted in which an increase in the degree of maliciousness of the file being analyzed 501 is observed over time, the increase starting not from the zero mark, but rather from a certain calculated value, so that the criterion of maliciousness will be reached earlier than in the initial case, or it will be reached whereas it would not have been reached in the initial case.

The decision on the detection of a malicious file 501 is made if the difference between the degree of the malicious file 501 and the limit degree of safety of the file 501 becomes less than a predetermined threshold value (point 913.B). Furthermore, in a particular instance, such a decision can be made only if the difference between the degree of the malicious file 501 and the limit degree of safety of the file 501 was previously becoming less than another predetermined threshold value (point 913.A) (wherein this difference between points 913A and 913B was able to increase).

For example, during the execution of a file 501 obtained from an unknown source or formed on the computer by "suspicious" methods (such as a writing of data from the memory of a process to disk), the degree of maliciousness may initially be higher than the degree of maliciousness of files obtained by less "suspicious" methods.

In the diagram 914 a situation is illustrated which is analogous to the situation depicted in diagram 911, with the only difference being that the curves describing the degree of maliciousness and the limit degree of safety have several successive points of intersection. In such a situation, the decision to recognize the file 501 as malicious is made not because of the fact of the intersection of these curves, but because of the exceeding of a predetermined threshold value by the number of intersections or because of the exceeding of a predetermined threshold value by the area cut out by these curves.

These diagrams help to increase the effectiveness of detection of malicious files and reduce the errors of the first and second kind in the detection of malicious files 501.

The description of the correlation between the calculated degree of maliciousness and limit degree of safety and the decision on recognizing the file 501 as malicious can be expressed in the following mathematical or algorithmic form:

$$\omega(t) > \varphi(t)$$
$$\sum_n (\omega(t_n) > \varphi(t_n))^2 > \varepsilon$$

FIG. 4 is a block diagram illustrating a computer system 20 on which aspects of systems and methods for post-route analysis of an autonomous vehicle may be implemented in accordance with an exemplary aspect. It should be noted that the computer system 20 can correspond to the analysis module 140, or other components of system 100, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for detecting malicious files comprising:
   emulating, using a processor, execution of a file under analysis, wherein the emulating further comprises opening the file under analysis by an interpreter;
   forming, using the processor, a behavior log of the emulated execution of the file under analysis;
   forming one or more behavior patterns from commands and parameters selected from the behavior log;
   calculating a convolution of the one or more behavior patterns;
   selecting two or more models for detecting malicious files from a database;
   calculating a plurality of degrees of maliciousness of the file being executed using the convolution and the two or more models, wherein the plurality of the degrees of maliciousness represents change in the plurality of degrees of maliciousness as a function of number of behavior patterns used to calculate the plurality of degree of maliciousness;
   forming a decision making template based on the plurality of degrees of maliciousness; and
   determining that the file is malicious when a degree of similarity between the decision making template and a predetermined decision making template exceeds a predetermined threshold value.

2. The method of claim 1, wherein the behavior log comprises intercepted commands and parameters to the commands originating from the file under analysis.

3. The method of claim 1, wherein the plurality of the degrees of maliciousness is a measure of a central tendency of calculated degrees of maliciousness.

4. The method of claim 1 further comprising:
   detecting that the degree of similarity between the decision making template and at least one of predetermined decision making templates exceeds a first predetermined threshold;
   detecting that the degree of maliciousness calculated using the two or more models for detecting malicious files do not exceed a second predetermined threshold; and
   retraining at least one of the two or more models for detecting malicious files.

5. The method of claim 1, wherein an inverse convolution function of a result of a convolution function performed to calculate the convolution has a degree of similarity to the one or more behavior patterns greater than a predetermined threshold value.

6. A system for detecting malicious files comprising:
   a hardware processor configured to:
   emulate execution of a file under analysis, wherein the hardware processor configured to emulate is further configured to open the file under analysis by an interpreter;
   form a behavior log of the emulated execution of the file under analysis;
   form one or more behavior patterns from commands and parameters selected from the behavior log;
   calculate a convolution of the one or more behavior patterns;
   select two or more models for detecting malicious files from a database;
   calculate a plurality of degrees of maliciousness of the file being executed based using the convolution and the two or more models, wherein the plurality of the degrees of maliciousness represents change in the plurality of degrees of maliciousness as a function of number of behavior patterns used to calculate the plurality of degree of maliciousness;
   form a decision making template based on the plurality of degrees of maliciousness; and
   determine that the file is malicious when a degree of similarity between the decision making template and a predetermined decision making template exceeds a predetermined threshold value.

7. The system of claim 6, wherein the behavior log comprises intercepted commands and parameters to the commands originating from the file under analysis.

8. The system of claim 6, wherein the plurality of the degrees of maliciousness is a measure of a central tendency of the calculated degrees of maliciousness.

9. The system of claim 6, wherein the hardware processor is further configured to:
   detect that the degree of similarity between the decision making template and at least one of predetermined decision making templates exceeds a first predetermined threshold; detect that the degree of maliciousness calculated using the two or more models for detecting malicious files do not exceed a second predetermined threshold; and retrain at least one of the two or more models for detecting malicious files.

10. The system of claim 6, wherein an inverse convolution function of a result of a convolution function performed to calculate the convolution has a degree of similarity to the one or more behavior patterns greater than a predetermined threshold value.

11. A non-transitory computer-readable medium comprising instructions thereon for detecting malicious files, the instructions comprising:
   emulating execution of a file under analysis, wherein the emulating further comprises opening the file under analysis by an interpreter;
   forming a behavior log of the emulated execution of the file under analysis;
   forming one or more behavior patterns from commands and parameters selected from the behavior log;
   calculating a convolution of the one or more behavior patterns;
   selecting two or more models for detecting malicious files from a database;
   calculating a plurality of degrees of maliciousness of the file being executed based using the convolution and the two or more models, wherein the plurality of the degrees of maliciousness represents change in the plurality of degrees of maliciousness as a function of number of behavior patterns used to calculate the plurality of degree of maliciousness;

forming a decision making template based on the plurality of degrees of maliciousness; and determining that the file is malicious when a degree of similarity between the decision making template and a predetermined decision making template exceeds a predetermined threshold value.

12. The medium of claim 11, wherein the behavior log comprises intercepted commands and parameters to the commands originating from the file under analysis.

* * * * *